US010025823B2

(12) United States Patent
Das et al.

(10) Patent No.: US 10,025,823 B2
(45) Date of Patent: Jul. 17, 2018

(54) TECHNIQUES FOR EVALUATING QUERY PREDICATES DURING IN-MEMORY TABLE SCANS

(71) Applicant: Oracle International Corporation, Redwood Shores, CA (US)

(72) Inventors: Dinesh Das, Redwood City, CA (US); Jiaqi Yan, San Carlos, CA (US); Mohamed Zait, San Jose, CA (US); Nirav Vyas, Karnataka (IN)

(73) Assignee: Oracle International Corporation, Redwood Shores, CA (US)

(*) Notice: Subject to any disclaimer, the term of this patent is extended or adjusted under 35 U.S.C. 154(b) by 427 days.

(21) Appl. No.: 14/806,614

(22) Filed: Jul. 22, 2015

(65) Prior Publication Data
US 2016/0350347 A1  Dec. 1, 2016

Related U.S. Application Data

(60) Provisional application No. 62/168,050, filed on May 29, 2015.

(51) Int. Cl.
G06F 17/30 (2006.01)
G06F 12/02 (2006.01)

(52) U.S. Cl.
CPC ...... G06F 17/30463 (2013.01); G06F 12/023 (2013.01); G06F 17/30339 (2013.01);
(Continued)

(58) Field of Classification Search
CPC ......... G06F 17/30463; G06F 17/30466; G06F 17/30477; G06F 12/023; G06F 17/30339;
(Continued)

(56) References Cited

U.S. PATENT DOCUMENTS 4,626,829 A  12/1986 Hauck
4,782,325 A  11/1988 Jeppsson et al.
(Continued)

FOREIGN PATENT DOCUMENTS

EP  1 111 500 A1  3/1996
EP  2040180 A1  3/2009
(Continued)

OTHER PUBLICATIONS

U.S. Appl. No. 14/337,179, filed Jul. 21, 2014, Notice of Allowance, dated Nov. 3, 2015.
(Continued)

Primary Examiner — Anh Ly
(74) Attorney, Agent, or Firm — Hickman Palermo Becker Bingham LLP

(57) ABSTRACT

Techniques are described herein for filtering data from a table during an in-memory scan. Predicates are pushed to in-memory scan to avoid scanning unnecessary columnar units and reduce the overhead of decompressing, row stitching and distributing data during evaluation. Techniques are described herein for generating implied predicates that have conditions on single columns from complex predicates that have multiple conditions on the same column, which can be evaluated during an in-memory scan. Techniques are also described herein to reduce the overhead of a table scan for processing a join query. When redistributing a first table for performing a hash-join, the nodes performing an in-memory scan of the first table may create a filter that tracks unique values from the join key. Data from the second table is only processed and transferred to other nodes in the cluster if the values from the join key pass through the filter.

20 Claims, 15 Drawing Sheets

(52) U.S. Cl.
CPC .. *G06F 17/30371* (2013.01); *G06F 17/30466* (2013.01); *G06F 17/30477* (2013.01); *G06F 17/30498* (2013.01); *G06F 17/30569* (2013.01); *G06F 2212/1044* (2013.01)

(58) Field of Classification Search
CPC ......... G06F 17/30371; G06F 17/30498; G06F 17/30569; G06F 17/30; G06F 2212/1044; G06F 17/30321; G06F 17/30153; G06F 17/30528; G06F 12/02
See application file for complete search history.

(56) References Cited

U.S. PATENT DOCUMENTS

| | | |
|---|---|---|
| 5,109,226 A | 4/1992 | MacLean |
| RE34,052 E | 9/1992 | Hester et al. |
| 5,175,810 A | 12/1992 | Young et al. |
| 5,287,193 A | 2/1994 | Lin |
| 5,423,010 A | 6/1995 | Mizukami |
| 5,511,190 A | 4/1996 | Sharma et al. |
| 5,581,705 A | 12/1996 | Passint et al. |
| 5,617,567 A | 4/1997 | Doktor |
| 5,655,080 A | 8/1997 | Dias et al. |
| 5,696,956 A | 12/1997 | Guttag |
| 5,696,959 A | 12/1997 | Guttag |
| 5,706,495 A | 1/1998 | Chadha et al. |
| 5,742,792 A | 4/1998 | Yanai et al. |
| 5,778,430 A | 7/1998 | Ish et al. |
| 5,826,529 A | 10/1998 | Doktor |
| 5,870,759 A | 2/1999 | Bauer et al. |
| 5,884,299 A | 3/1999 | Ramesh |
| 5,887,183 A | 3/1999 | Agararal |
| 5,884,229 A | 5/1999 | Ramesh et al. |
| 5,933,650 A | 8/1999 | Van Hook |
| 5,987,407 A | 11/1999 | Wu |
| 6,006,179 A | 12/1999 | Wu |
| 6,009,432 A | 12/1999 | Tarin |
| 6,047,081 A | 4/2000 | Groezinger et al. |
| 6,065,070 A | 5/2000 | Johnson |
| 6,118,724 A | 9/2000 | Higginbottom |
| 6,219,457 B1 | 4/2001 | Potu |
| 6,317,824 B1 | 11/2001 | Thakkar et al. |
| 6,331,826 B1 | 12/2001 | Wagner |
| 6,336,180 B1 | 1/2002 | Long |
| 6,381,601 B1 | 4/2002 | Fujiwara et al. |
| 6,416,410 B1 | 7/2002 | Abou-Samra |
| 6,609,131 B1 | 8/2003 | Zait |
| 6,671,797 B1 | 12/2003 | Golston |
| 6,745,174 B2 | 6/2004 | Levy et al. |
| 6,829,697 B1 | 12/2004 | Davis et al. |
| 6,842,848 B2 | 1/2005 | Hokenek et al. |
| 6,954,776 B1 | 10/2005 | Cruanes |
| 6,996,569 B1 | 2/2006 | Bedell et al. |
| 7,020,661 B1 * | 3/2006 | Cruanes ............ G06F 17/30498 707/E17.104 |
| 7,047,252 B2 | 5/2006 | Buch et al. |
| 7,149,769 B2 | 12/2006 | Lubbers et al. |
| 7,725,595 B1 | 5/2010 | Geissler et al. |
| 7,769,726 B2 | 8/2010 | Faerber et al. |
| 7,861,060 B1 | 12/2010 | Nickollis et al. |
| 7,991,794 B2 | 8/2011 | Bedi et al. |
| 8,049,760 B2 | 11/2011 | Jiao et al. |
| 8,126,855 B2 | 2/2012 | Faerber et al. |
| 8,244,780 B1 * | 8/2012 | Narayanan ........ G06F 17/30345 707/804 |
| 8,260,803 B2 | 9/2012 | Hsu et al. |
| 8,285,709 B2 | 10/2012 | Candea et al. |
| 8,326,810 B2 | 12/2012 | Faerber et al. |
| 8,433,684 B2 | 4/2013 | Munoz |
| 8,521,788 B2 | 8/2013 | Ellison et al. |
| 8,533,216 B2 | 9/2013 | Buger et al. |
| 8,543,534 B2 | 9/2013 | Alves et al. |
| 8,572,131 B2 | 10/2013 | Ellison et al. |
| 8,667,252 B2 | 3/2014 | Colavin et al. |
| 8,725,707 B2 | 5/2014 | Chen et al. |
| 8,826,522 B2 | 9/2014 | Roblot |
| 8,856,484 B2 | 10/2014 | Ben-Tsion et al. |
| 8,938,644 B2 | 1/2015 | Clark et al. |
| 8,996,463 B2 | 3/2015 | Merriman et al. |
| 9,292,564 B2 | 3/2016 | Kamp et al. |
| 9,432,298 B1 | 8/2016 | Smith |
| 2001/0037345 A1 | 11/2001 | Kiernan et al. |
| 2002/0032678 A1 | 3/2002 | Cornwell et al. |
| 2002/0184392 A1 | 12/2002 | Parthasarathy et al. |
| 2002/0188830 A1 | 12/2002 | Boles et al. |
| 2002/0194157 A1 | 12/2002 | Zait |
| 2003/0167460 A1 | 9/2003 | Desai |
| 2003/0187858 A1 | 10/2003 | Kirk et al. |
| 2004/0030863 A1 | 2/2004 | Paver |
| 2004/0068642 A1 | 4/2004 | Tanaka |
| 2004/0221192 A1 | 11/2004 | Motta |
| 2005/0055380 A1 | 3/2005 | Thompson et al. |
| 2005/0091256 A1 | 4/2005 | Rathakrishnan et al. |
| 2005/0131879 A1 | 6/2005 | Ghosh |
| 2005/0177706 A1 | 8/2005 | Lee |
| 2006/0116989 A1 | 6/2006 | Bellamkonda et al. |
| 2006/0173833 A1 | 8/2006 | Purcell et al. |
| 2006/0179255 A1 | 8/2006 | Yamazaki |
| 2006/0218194 A1 * | 9/2006 | Yalamanchi ........ G06F 17/2241 707/E17.125 |
| 2007/0050328 A1 | 3/2007 | Li |
| 2007/0203925 A1 | 8/2007 | Sandler et al. |
| 2007/0208695 A1 | 9/2007 | Burger |
| 2008/0033914 A1 | 2/2008 | Cherniack |
| 2008/0046686 A1 | 2/2008 | Cameron |
| 2008/0059492 A1 | 3/2008 | Tarin |
| 2008/0086480 A1 * | 4/2008 | Srivastava ........ G06F 17/30575 707/E17.005 |
| 2008/0086495 A1 * | 4/2008 | Kiziltunc ............... G06Q 10/10 707/E17.102 |
| 2008/0256250 A1 | 10/2008 | Wakefield |
| 2008/0281784 A1 | 11/2008 | Zane et al. |
| 2008/0281865 A1 | 11/2008 | Price et al. |
| 2008/0294863 A1 | 11/2008 | Faerber et al. |
| 2009/0037700 A1 | 2/2009 | Graham |
| 2009/0055350 A1 | 2/2009 | Branish et al. |
| 2009/0094193 A1 | 4/2009 | King et al. |
| 2009/0100089 A1 | 4/2009 | Eadon |
| 2009/0119247 A1 | 5/2009 | Bellamkonda |
| 2009/0254522 A1 | 10/2009 | Chaudhuri |
| 2009/0287628 A1 | 11/2009 | Indeck |
| 2009/0287637 A1 | 11/2009 | Day et al. |
| 2009/0307290 A1 | 12/2009 | Barsness et al. |
| 2009/0313210 A1 | 12/2009 | Bestgen et al. |
| 2010/0030728 A1 | 2/2010 | Chakkappen et al. |
| 2010/0030796 A1 | 2/2010 | Netz et al. |
| 2010/0082705 A1 | 4/2010 | Bhashyam et al. |
| 2010/0088309 A1 | 4/2010 | Petcelescu et al. |
| 2010/0106944 A1 | 4/2010 | Symes |
| 2010/0115347 A1 | 5/2010 | Noyes |
| 2010/0161646 A1 | 6/2010 | Ceballos et al. |
| 2010/0191918 A1 | 7/2010 | Lee et al. |
| 2010/0235335 A1 | 9/2010 | Heman et al. |
| 2010/0235347 A1 | 9/2010 | Chaudhuri |
| 2010/0250549 A1 | 9/2010 | Muller et al. |
| 2010/0278446 A1 | 11/2010 | Ganesh et al. |
| 2010/0299316 A1 | 11/2010 | Faerber et al. |
| 2011/0029557 A1 | 2/2011 | Raghavan et al. |
| 2011/0029569 A1 | 2/2011 | Ganesh et al. |
| 2011/0047144 A1 | 2/2011 | Han |
| 2011/0106804 A1 | 5/2011 | Keeler et al. |
| 2011/0119249 A1 * | 5/2011 | Flatz ................. G06F 17/30466 707/714 |
| 2011/0137890 A1 | 6/2011 | Bestgen |
| 2011/0138123 A1 | 6/2011 | Aditya et al. |
| 2011/0225123 A1 | 9/2011 | D'Souza |
| 2012/0047158 A1 | 2/2012 | Lee |
| 2012/0054225 A1 | 3/2012 | Marwah et al. |
| 2012/0166447 A1 | 6/2012 | Nice |
| 2012/0173515 A1 | 7/2012 | Jeong et al. |
| 2012/0197868 A1 | 8/2012 | Fauser |
| 2012/0209873 A1 | 8/2012 | He |

(56) References Cited

U.S. PATENT DOCUMENTS

| | | | |
|---|---|---|---|
| 2012/0310916 A1* | 12/2012 | Abadi | G06F 17/30445 707/713 |
| 2012/0323971 A1 | 12/2012 | Pasupuleti | |
| 2013/0151567 A1 | 6/2013 | Ellison et al. | |
| 2013/0151568 A1 | 6/2013 | Ellison et al. | |
| 2013/0159285 A1 | 6/2013 | Dees | |
| 2013/0166588 A1 | 6/2013 | Gruschko | |
| 2013/0275473 A1 | 10/2013 | Ellison et al. | |
| 2013/0303663 A1 | 11/2013 | Agnely et al. | |
| 2014/0013076 A1 | 1/2014 | Ganesh et al. | |
| 2014/0013077 A1 | 1/2014 | Ganesh et al. | |
| 2014/0013078 A1 | 1/2014 | Ganesh et al. | |
| 2014/0040218 A1 | 2/2014 | Kimura et al. | |
| 2014/0052713 A1 | 2/2014 | Schauer et al. | |
| 2014/0052726 A1 | 2/2014 | Amberg et al. | |
| 2014/0067791 A1 | 3/2014 | Idicula | |
| 2014/0074818 A1 | 3/2014 | Barber | |
| 2014/0075493 A1 | 3/2014 | Krishnan et al. | |
| 2014/0095748 A1 | 4/2014 | Aingaran et al. | |
| 2014/0096145 A1 | 4/2014 | Aingaran et al. | |
| 2014/0108378 A1 | 4/2014 | Alpers | |
| 2014/0173702 A1 | 6/2014 | Wong | |
| 2014/0279838 A1* | 9/2014 | Tsirogiannis | G06F 17/30292 707/603 |
| 2014/0317159 A1 | 10/2014 | Dhavale | |
| 2015/0046411 A1 | 2/2015 | Kazmaier | |
| 2015/0088811 A1 | 3/2015 | Hase et al. | |
| 2015/0088822 A1 | 3/2015 | Raja et al. | |
| 2015/0088824 A1 | 3/2015 | Kamp et al. | |
| 2015/0088830 A1 | 3/2015 | Kamp et al. | |
| 2015/0088926 A1 | 3/2015 | Chavan et al. | |
| 2015/0089125 A1 | 3/2015 | Mukherjee et al. | |
| 2015/0089134 A1 | 3/2015 | Mukherjee et al. | |
| 2015/0149704 A1 | 5/2015 | Lee | |
| 2016/0007037 A1 | 1/2016 | Zhao et al. | |
| 2016/0019064 A1 | 1/2016 | Brooks et al. | |
| 2016/0034486 A1 | 2/2016 | Dageville | |
| 2016/0350371 A1 | 12/2016 | Das et al. | |
| 2016/0350375 A1 | 12/2016 | Das et al. | |
| 2017/0024435 A1 | 1/2017 | Kociubes et al. | |
| 2017/0060587 A1 | 3/2017 | Chavan | |
| 2017/0270052 A1 | 9/2017 | Brown et al. | |
| 2017/0270053 A1 | 9/2017 | Brown | |

FOREIGN PATENT DOCUMENTS

| | | |
|---|---|---|
| EP | 2423843 A1 | 2/2012 |
| EP | 2 608 070 A1 | 6/2013 |
| GB | 1 332 631 A | 10/1973 |
| GB | 2 306 868 A | 5/1997 |
| JP | 2000261674 A | 9/2000 |
| WO | WO 00/08552 A1 | 2/2000 |
| WO | WO2007/078444 A1 | 7/2007 |
| WO | WO2010/039895 | 4/2010 |
| WO | WO 2013/095653 A1 | 6/2013 |
| WO | WO 2013/095662 A1 | 6/2013 |

OTHER PUBLICATIONS

Das, U.S. Appl. No. 14/806,597, filed Jul. 22, 2015, Office Action, dated Oct. 18, 2017.
Chavan, U.S. Appl. No. 14/338,219, filed Jul. 22, 2014, Notice of Allowance, dated Sep. 25, 2017.
Chavan, U.S. Appl. No. 14/338,219, filed 047/22/2014, Interview Summary, dated Sep. 11, 2017.
Brown, U.S. Appl. No. 15/074,248, filed Mar. 18, 2016, Office Action, dated Sep. 25, 2017.
Brown, U.S. Appl. No. 15/073,905, filed Mar. 18, 2016, Office Action, dated Sep. 25, 2017.
U.S. Appl. No. 14/337,179, filed 074/21/2014, Notice of Allowance, dated Jul. 29, 2015.
U.S. Appl. No. 14/337,179, filed Jul. 21, 2014, Office Action, dated Dec. 29, 2014.
U.S. Appl. No. 14/337,179, filed Jul. 21, 2014, Interview Summary, dated Jun. 17, 2015.
U.S. Appl. No. 14/337,179, filed Jul. 21, 2014, Final Office Action, dated Apr. 10, 2015.
Thekkath et al., "Separating Data and Control Transfer in Distributed Operating Systems", ASPLOS, San Jose, ACM, dated 1994, 10 pages.
O'Brien, Frank, "The Appollo Guidance Computer-Architecture and Operation", dated 2010, Springer, pp. 27-28, 54, 76 and 1414.
Binkert et al., "A Simple Integrated Network Interface for High-Bandwidth Servers", dated Jan. 2006, 22 pages.
Ganesh, U.S. Appl. No. 14/023,249, filed Sep. 10, 2013, Notice of Allowance, dated Feb. 27, 2017.
Chavan, U.S. Appl. No. 14/338,219, filed Jul. 22, 2014, Restriction Requirement, dated Jan. 13, 2017.
Ganesh, U.S. Appl. No. 14/023,064, filed Sep. 10, 2013, Notice of Allowance, dated Jun. 16, 2017.
Chavan, U.S. Appl. No. 14/3385,219, filed Jul. 22, 2014, Office Action, dated Jun. 2, 2017.
Brooks, U.S. Appl. No. 14/867,929, filed Sep. 28, 2015, Office Action, dated Jul. 13, 2017.
Schaffner, et al., "A Hybrid Row-Column OITP Database Architecture for Operational Reporting", dated 2009, 14 pages.
Ramamurthy, Ravishankar, "A Case for Fractured Mirrors" Proceedings of the 28th VLDB Conference, dated, 2002, 12 pages.
Phipps, Colin:, "Mapping Deflated Files", Internet Article, dated Jan. 6, 2013, http://zsync.moria.org.uk/paper/ch03s02.html, 3 pages.
Nirmesh, Malviya, "Recovery Algorithms for In-Memory OLTP Databases", Master of Science Thesis, dated Jul. 1, 2012, 66 pages.
Khalid Sayood:, "Introduction to data Compression", Morgan Kaufmann Publisher, dated Dec. 1996, 4 pages.
Farber et al., "SAP HANA Database—Data Management for Modern Business Applications", SIGMOD Record, dated Dec. 2011, vol. 40, No. 4, 8 pages.
Schmit et al., "PipeRench: A Virtualized Programmable Datapath in 0.18 Micron Technology", dated 2002, 4 pages.
"MonetDB", Wikipedia, available: http://en.wikipedia.org/wiki/MonetDB, dated May 16, 2012, 3 pages.
Anonymous:, "Hash Table—Wikipedia, the free encyclopedia", dated Jun. 20, 2012, retrieved from the internet: http://wayback.archive.org/wiki/harshtable, 18 pages.
Brewer et al., "Remote Queues: Exposing Message Queues for Optimization and Atomicity", dated Jul. 17, 1995, ACM, 12 pages.
CCCP: Accelerator Virtualization, http://cccp.eecs.umich.edu/research/virtual.php, printed on Jul. 4, 2012, 3 pages.
Dynamic Scheduling Techniques, http://www.cs.iastate.edu/~prabhu/Tutorial/PIPELINE/dynamSchedTech.html, printed on Jul. 4, 2012, 2 pages.
"Column Store Features" monedb, available: http://moneybd.org/Home/Features, dated 2008-2013, 3 pages.
Park et al., "Polymorphic Pipeline Array: A Flexible Multicore Accelerator with Virtualized Execution for Mobile Multimedia Applications", Dated Dec. 12, 2009 11 pages.
Zukowski, M. "Vectorwise: Beyond Column Stores" ACTIAN 2012, 17 pages.
Silva et al., "Using a Tighly-Coupled Pipeline in Dynamically Reconfigureable Platform FPGAs", dated May 2003, 4 pages.
W. Cockshott et al., "High-Performance Operations Using a Compressed Database Architecture", The Computer Journal, vol. 41, 1998, 14 pages.
Weinhardt, Markus, "Compilation and Pipeline Synthesis for Reconfigurable Architectures", 1997, 8 pages.
Wikipedia, "In Memory Database", Dated Jan. 30, 2013, 4 pages.
Wikipedia, "SIMD", Single Instruction Multiple Instruction, dated Jan. 1, 2013, 7 pages.
Zhou et al., "Efficient SIMD Optimization for Media Processors", Journal of Zhejiang University Science A, dated Apr. 2008, 7 pages.
IBM, "Data Packing and Unpacking Scheme for High Performance Image Processsing", vol. 36., No. 7, dated Jul. 1993, 6 pages.
U.S. Appl. No. 13/590,110, filed Aug. 20, 2012, Office Action, dated Dec. 18, 2013.

(56) References Cited

OTHER PUBLICATIONS

U.S. Appl. No. 13/590,057, filed Aug. 20, 2012, Advisory Aciton, dated Feb. 26, 2015.
U.S. Appl. No. 13/590,057, filed Aug. 20, 2012, Final Office Action, dated Oct. 19, 2015.
U.S. Appl. No. 13/590,057, filed Aug. 20, 2012, Final Office Action, dated Nov. 18, 2014.
U.S. Appl. No. 13/590,057, filed Aug. 20, 2012, Notice of Allowance, dated Sep. 30, 2016.
U.S. Appl. No. 13/590,057, filed Aug. 20, 2012, Office Action, dated Apr. 22, 2015.
U.S. Appl. No. 13/590,057, filed Aug. 20, 2012, Office Action, dated Jul. 1, 2014.
U.S. Appl. No. 13/590,110, filed Aug. 20, 2012, Final Office Action, dated Mar. 27, 2015.
U.S. Appl. No. 13/590,110, filed Aug. 20, 2012, Office Action, dated Apr. 14, 2016.
U.S. Appl. No. 13/590,0547, filed Aug. 20, 2012, Advisory Action, dated Feb. 11, 2016.
U.S. Appl. No. 13/590,110, filed Aug. 20, 2012, Office Action, dated Oct. 2, 2015.
U.S. Appl. No. 13/590,057, filed Aug. 20, 2012, Advisory Action, dated Feb. 11, 2016.
U.S. Appl. No. 13/590,110, filed Aug. 20, 2012, Notice of Allowance, dated Aug. 1, 2016.
U.S. Appl. No. 14/023,064, filed Sep. 10, 2013, Final Office Action, dated Oct. 6, 2016.
U.S. Appl. No. 14/023,064, filed Sep. 10, 2013, Office Action, dated Mar. 28, 2016.
U.S. Appl. No. 14/023,249, filed Sep. 10, 2013, Office Action, dated Jan. 20, 2016.
U.S. Appl. No. 14/023,249, filed Sep. 10, 2013, Office Action, dated Aug. 25, 2016.
U.S. Appl. No. 13/590,057, filed Aug. 20, 2012, Office Action, dated Jan. 7, 2014.
U.S. Appl. No. 13/590,110, filed Aug. 20, 2012, Office Action, dated Jul. 1, 2014.

* cited by examiner

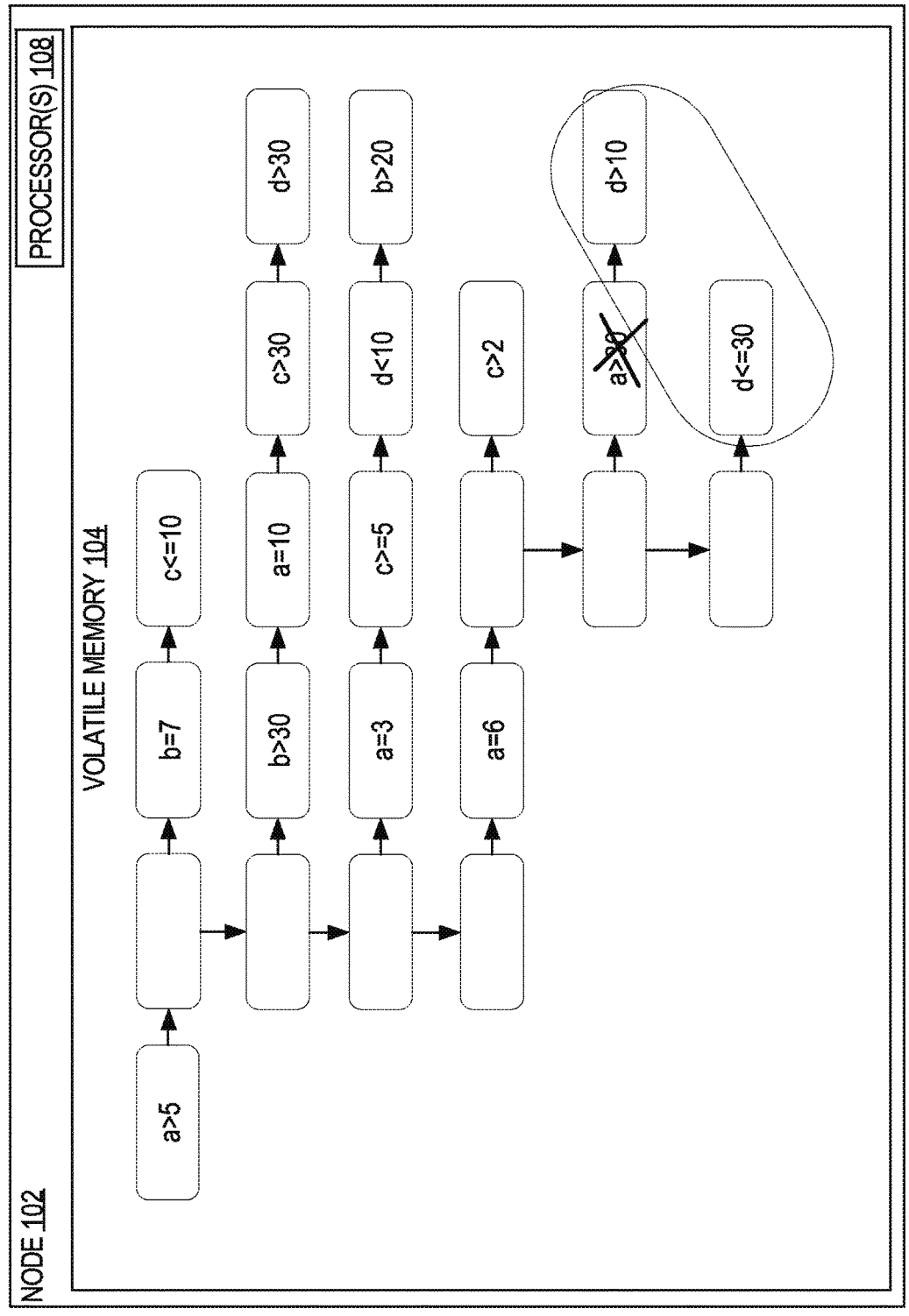

TECHNIQUES FOR EVALUATING QUERY PREDICATES DURING IN-MEMORY TABLE SCANS

CROSS-REFERENCE TO RELATED APPLICATIONS; BENEFIT CLAIM

This application claims the benefit of U.S. Provisional Application No. 62/168,050, filed May 29, 2015, the entire contents of which is hereby incorporated by reference as if fully set forth herein, under 35 U.S.C. § 119(e).

This application is related to:
U.S. application Ser. No. 14/806,597, filed on the same day herewith entitled, "OPTIMIZER STATISTICS FOR IN-MEMORY TABLES"; and
U.S. application Ser. No. 14/806,601, filed on the same day herewith entitled, "OPTIMIZING EXECUTION PLANS FOR MEMORY-AWARE JOINS."
The contents of both of which are incorporated herein by reference as if fully disclosed herein.

FIELD OF THE INVENTION

The present invention relates to data storage and retrieval techniques, and more specifically to improved computer-implemented techniques for evaluating query predicates during an in-memory scan of columnar units.

BACKGROUND

A query may include one or more predicates that provide conditions for returning data items from a table to the requesting user or application. Traditionally, evaluating these predicates involves reading each row from the table and evaluating each condition row-by-row. This method was employed because on-disk row-major tables have been the dominant storage mechanism in relational databases for decades. Over the last decade, however, there has been an explosive growth in demand for faster analytics. After recognizing the need for faster analytics, the industry responded with the adoption of column-oriented databases.

U.S. patent application Ser. No. 14/337,170, filed Jul. 21, 2014, entitled "Mirroring, In Memory, Data From Disk To Improve Query Performance", (referred to hereafter as the "Mirroring Application") is incorporated herein in its entirety. The Mirroring Application describes a dual-format database that allows existing row-major on-disk tables to have complementary in-memory columnar representations. On-disk tables are organized into row-major "blocks", while the in-memory copies of the tables, or portions thereof, are organized into "in-memory compression units" (IMCUs).

Unfortunately, the current techniques of performing predicate evaluation during an in-memory scan of columnar data require row stitching before predicate evaluation can be performed in row major representations in the execution engine. The in-memory scan involves scanning blocks of columnar units, decompressing the columnar units, and then stitching the columnar units back into rows, so the predicates may be evaluated against row-major data. The process of scanning, stitching, and then evaluating incurs unnecessary overhead for rows that do not satisfy the predicate.

The unnecessary overhead for evaluating predicates against columnar data may be exacerbated when evaluating a join predicate. A join predicate joins the rows of two or more tables on a particular column called the "join-key". To evaluate the join predicate, the rows from each table in the join need to be decompressed and stitched together. Then, the row from one table is compared to the row of another table to evaluate whether the rows match the join condition. If the rows from each table do not match the join condition, the combination will not appear in the join result. For join evaluation, a query execution engine potentially needs to evaluate the join predicate on all combinations of the rows from both tables, inducing huge overheads. Additionally, in a database cluster, rows residing in one node may be broadcast to different target nodes that are each assigned to perform the join operation on a discrete set of data. The additional cost of broadcasting data from one server to another server incurs additional overhead in computing resources when some of the rows will ultimately not appear in the join result.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 2A-2D are block diagrams of a database system generating implied predicates from a complex predicate;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Figure 8:
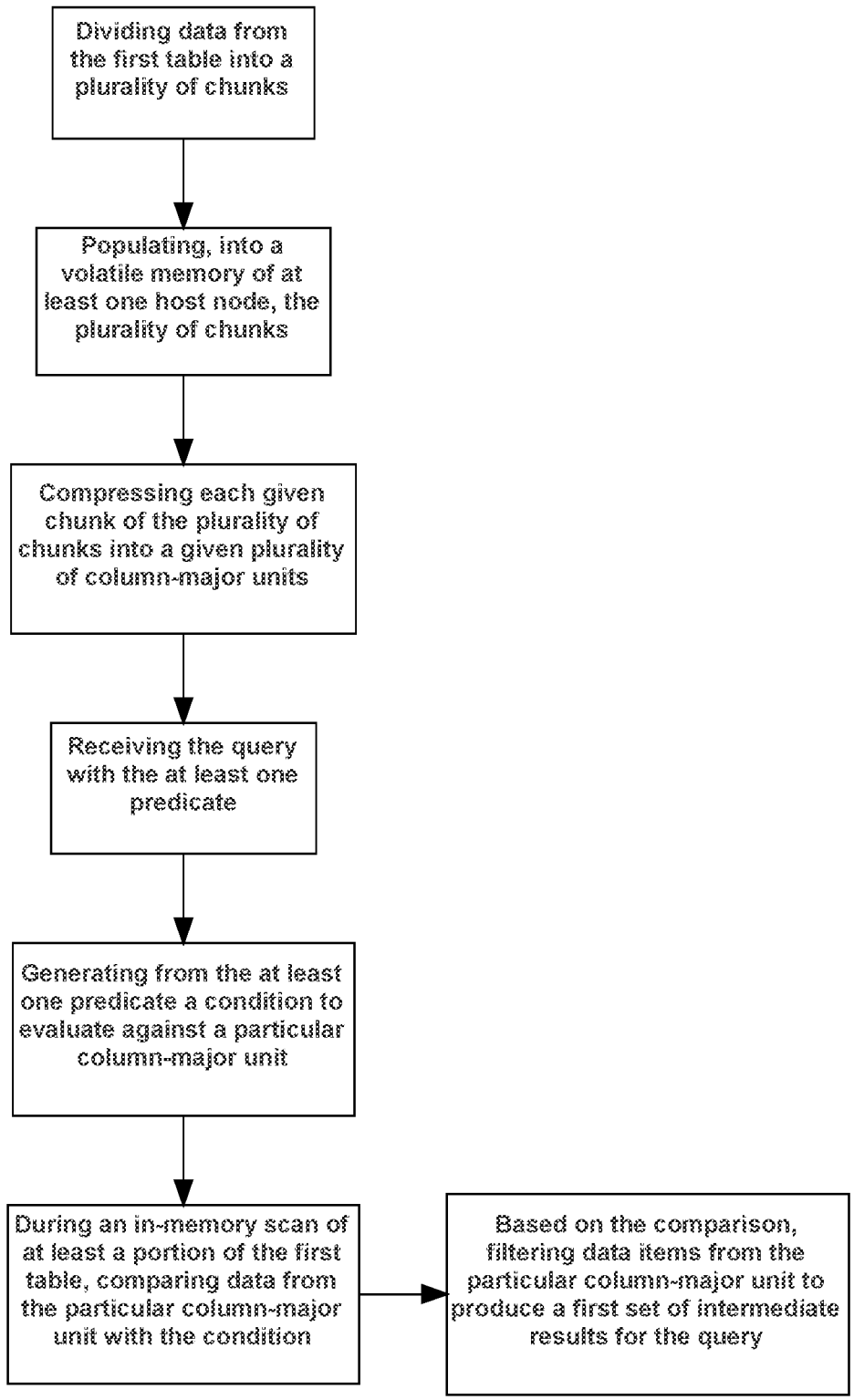
FIG. 8 is a block diagram depicting an example process for the techniques described herein.

Techniques are described herein for filtering data from a table during an in-memory scan. See, e.g., FIG. 8. Once the data is filtered, the data does not have to be considered for other later stage query processing. A database server receives a query with a predicate. Each condition of the predicate may be evaluated against corresponding in-memory columnar units (CUs.) Each CU has storage index that refers to a range of values stored within the CU. When scanning a table, the storage index of a CU may be compared with single column conditions to determine whether any data items within a particular CU may satisfy the predicate's condition. If a CU does not have any data that can satisfy a predicate's condition, then data items from the related CUs may be filtered from further scanning. Removing data items from further query processing during an in-memory scan may be referred to as pushing the predicate down to the scan.

According to some embodiments, predicates of a query that can be evaluated directly on IMCUs without having to first decompress the IMCU data are identified during query compilation. Any such identified predicates are then pushed-down to the in-memory scan to be evaluated directly against the IMCUs. Predicates in the query that cannot be pushed-down to the in-memory scan can be evaluated as usual. By pushing down qualifying query predicates to the in-memory scan for direct evaluation against IMCUs, decompressing and stitching IMCU data is avoided.

According to some embodiments, an implied predicate which can be pushed to in-memory scan is generated based on query predicates that cannot be pushed-down to the in-memory scan. There are certain types of complex predicates that cannot be pushed down directly to the in-memory scan. This could be because the predicate contains multiple columns, or join conditions with other tables, or complex functions such as sampling clauses that cannot be evaluated in its compressed format. Techniques are described herein for generating implied predicates from these complex predicates. The implied predicate is then pushed-down to the in-memory scan. By generating the implied predicate and pushing down the implied predicate to the in-memory scan, decompressing and stitching some IMCU data is avoided even though the query predicate itself cannot be pushed down to the in-memory scan.

According to some embodiments, a join predicate may be used to create a join filter for the in-memory scan of a second table. During an in-memory scan of a first table, distinct values from the join key of the first table are used to create a join filter. During an in-memory scan of the second table, the join filter is applied to the IMCUs from the second table. Rather than decompressing, stitching, and evaluating the join predicate for the entire second table, only data items that pass through the join filter are processed. In addition, in a multi-node database cluster, the second table is only redistributed to target nodes after the second table is filtered. Redistributing the filtered data instead of the entire second table minimizes the inter-process communication among nodes.

System Overview

Figure 1:
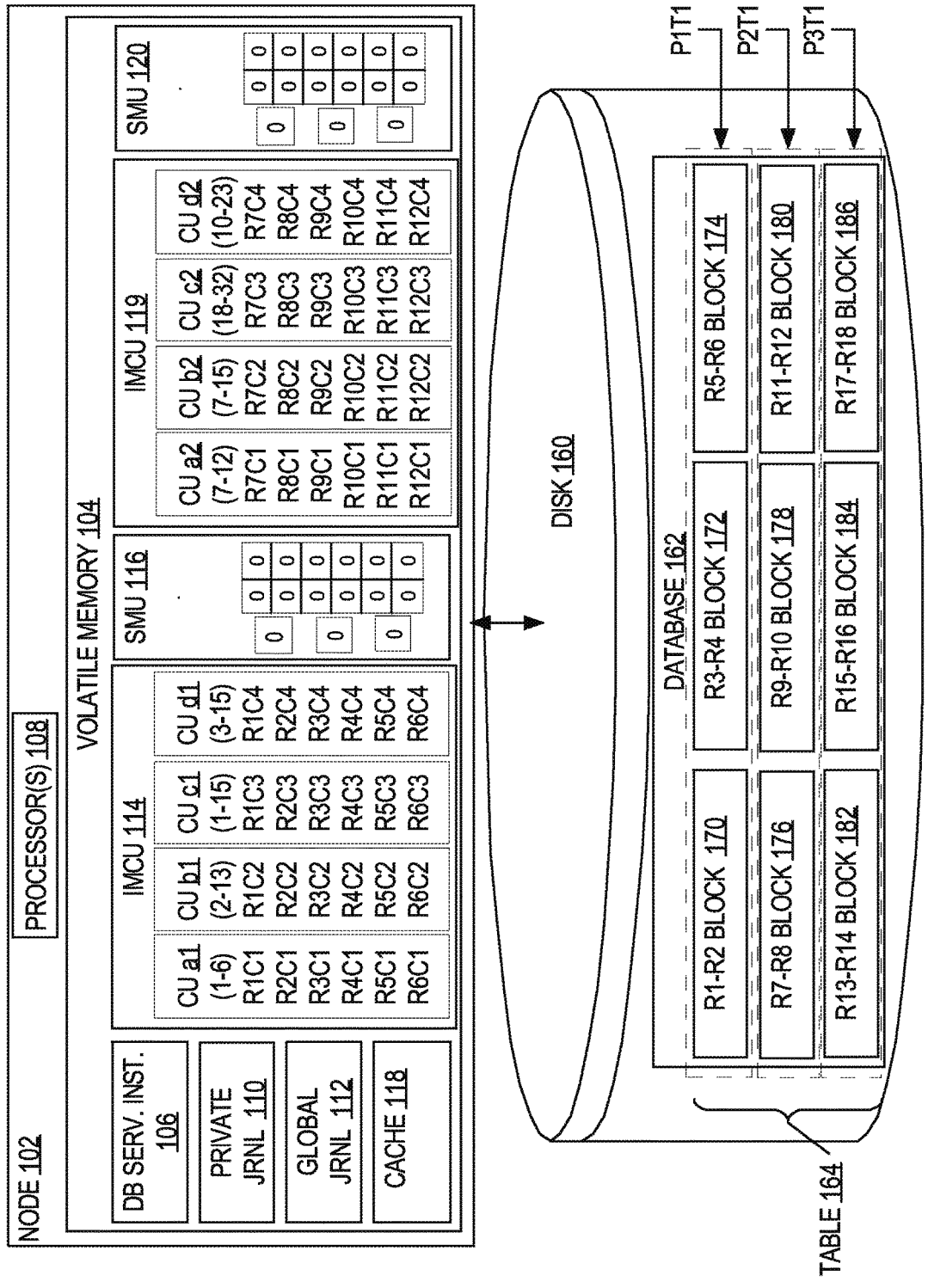
FIG. 1 is a block diagram of a dual format database system.

Referring to FIG. 1, it is a block diagram that depicts a dual format database system 100 according to one embodiment. In the embodiment illustrated in FIG. 1, one node 102 has access to database 162 on disk 160. For the purpose of illustration, database 162 is shown on a separate disk 160, but in alternative embodiments disk 160 may be part of node 102.

Node 102 has one or more processors 108 and local volatile memory 104. In addition, node 102 is executing database server instance 106. While in the illustrated embodiment node 102 is executing a single database server instance 106, in alternative embodiments a single node may execute more than one database server instance.

Database 162 includes a table 164. Database server instance 106 may access data items of table 164 from the copy of table 164 that resides on disk 160. However, it is much faster for any given database server instance to access data items of table 164 that are cached in buffer cache 118.

Table 164 is composed of nine blocks 170, 172, 174, 176, 178, 180, 182, 184, 186 organized into three partitions (P1T1, P2T1 and P3T1). According to one embodiment, if table 164 has been designated as "in-memory enabled", selected columns from blocks 170-186 from each partition P1T1, P2T1, P3T1 are divided into chunks and loaded together during the population of volatile memory. In the example in FIG. 1, all chunks from P1T1 and P2T1 are hosted by node 102.

Dual-Format Database Overview

As described in detail in the Mirroring Application, within a dual-format database, data from a table can reside in both columnar format in an in-memory column store and in row-major format on disk. The in-memory columnar format speeds up analytic queries and the row-major format is well suited for answering On-Line Transaction Processing (OLTP) queries.

It should be noted that scanning on-disk tables does not necessarily mean disk I/O. Some or all of the blocks of the table-to-be-scanned may be cached in volatile memory, in persistent format, in buffer cache 118. Thus, within a dual-format database, it is possible for there to be at least three copies of the same item available: (a) a copy in persistent format on disk, (b) a copy in persistent format in volatile memory (the buffer cache), and (c) a copy in mirror format in volatile memory.

Population

The creation and storage of columnar data in the volatile memory 104 is called population. Population is done from the persistent format row-major data (referred to as PF data herein). Specifically, the in-memory area is populated by reading items from table 164, which resides on disk 160, converting the items into mirror format, and storing the items in the in-memory area. In the illustrated embodiment, the mirror format data (referred to as MF data herein) is a columnar representation that includes contiguously allocated chunks called In-Memory Compression Units (IMCUs 114, 119).

In the embodiment illustrated in FIG. 1, IMCUs 114, 119 contain items extracted from a set of rows of table 164. Table 164 itself is stored on disk 160 as PF data.

According to one embodiment, partitions and sub-partitions of a partitioned table are organized into IMCUs independently of each other, and an IMCU does not span multiple partitions. A single partition or sub-partition can, however, have multiple IMCUs. For the purpose of illustration, only one IMCU is presented for storing a partition. However, an entire partition will often require a single node to host multiple IMCUs for that partition. The size of an IMCU may vary depending on the type of compression(s) used.

Journals and SMUs

Each database operation is tracked in a private journal 110 as part of a transaction. A transaction is a sequence of database operations that are treated as a single unit. Using the private journal, a node may track transaction-specific changes to a table. The transaction is able to see all transaction-specific changes that are applied to the table, but no other transactions can see those changes until the transaction commits. For example if node 102 is tracking a transaction, updates stored in private journal 110 are only accessible by that transaction until commit.

Once the transaction commits, the aggregate changes are pushed to a corresponding global journal. Rather than updating an IMCU for every committed transaction that modifies an IMCU, the aggregate changes are stored in a separate data structure. Storing the data in an additional data structure avoids the overhead of decompressing and re-compressing the IMCU.

To ensure that each node is aware of the IMCU data that is no longer valid, each IMCU 114, 119 has a corresponding SMU 116, 120 that provides a bitmap of which portions of the IMCU are invalid. In the example in FIG. 1, the first column of an SMU indicates whether a block in the corresponding IMCU is invalid. The second column indicates whether a row in the corresponding IMCU is invalid. The third column indicates whether additional transaction data corresponding to a row may be found in a corresponding journal.

Columnar Units

Within IMCUs 114, 119 items from each column of table 164 are stored separately and contiguously as columnar units (CUs). Specifically, IMCU 114 includes CU a1, CU b1, CU c1, CU d1; and IMCU 119 includes CU a2, CU b2, CU c2, CU d2. Each group of CUs from an IMCU respectively contains items of table 164 from columns "C1", "C2", "C3", and "C4". For simplicity, these columns may be referred to as columns "a", "b", "c", and "d", respectively.

Each column may be compressed at different compression levels. For example, CU a1 may be compressed at a compression level CL1, while CU b1 is compressed at a compression level CL2. Further, different CUs of the same column may be compressed differently. For example, in IMCU 114, CU a1 for a "row_id" column may be compressed at level CL1, but in a different IMCU 119, CU a1 for the "row_id" column may be compressed at a different level CL2.

Different compression levels are suitable for different use cases. For example, compression techniques have been developed that are specifically optimized for DML performance. Other compression techniques are optimized for query performance. Yet other techniques are optimized for space capacity. Examples of different encoding schemes used, include, but are not necessarily limited to, dictionary encoding, run-length encoding (RLE) Huffman coding, and delta coding.

Each columnar unit also contains MN-MAX data as a CU storage index. The MIN-MAX values describe the range of values contained within a CU. For example:

CU a1 has a MIN-MAX of (1-6), meaning the minimum value of a data element in CU a1 is 1, and a maximum value of a data element in CU a1 is 6;
CU b1 has a MN-MAX of (2-13), meaning the minimum value of a data element in CU2 is 2, and a maximum value of a data element in CU b1 is 13;
CU c1 has a MIN-MAX of (1-15), meaning the minimum value of a data element in CU c1 is 1, and a maximum value of a data element in CU c1 is 15; and
CU d1 has a MN-MAX of (3-15), meaning the minimum value of a data element in CU d1 is 3, and a maximum value of a data element in CU d1 is 15.

Query Optimizer

A database server instance 106 contains a query optimizer, so a node 102 may receive a query and determine an optimized query execution plan. The optimizer is usually comprised of various components. The estimator component computes predicate selectivities (which help determine the resulting cardinalities of scans, joins, and aggregations) and estimates the costs of various database operations including access paths, join methods, aggregations, communication between parallel processes, and many more. A cost-based query transformation component works in conjunction with the estimator to enumerate and compare semantically equivalent forms of the query. The query optimizer determines whether to perform transformations on the given query and tries to pick the optimal access method and other database operation methods for the given query.

In-Memory Scan Overview

An in-memory scan refers to the operation of obtaining at least some of the data items that satisfy a query from MF data, rather than the PF data on-disk or cached copies of the PF data stored in buffer cache 118.

According to one embodiment, an in-memory scan starts by locating the IMCUs that contain the required rows. Within each IMCU, it is typically only necessary to look at the CUs of the columns referenced in the query. An in-memory scan involves reading CUs, instead of reading blocks row-by-row.

According to one embodiment, all necessary columns must be in-memory-enabled to use an in-memory scan. For example, in such an embodiment, the query "SELECT C1, C3 FROM Table164 WHERE C3>100" may be satisfied by an in-memory scan of IMCU 114, while the query "C5 FROM Table164 where C3>100" would not (because "C5" is not one of the columns for which IMCU 114 has a CU).

According to another embodiment, when some data is only available on-disk, the query optimizer may consider a hybrid query execution plan. For example, given the above query, the query execution plan may be divided into different branches for evaluating the in-memory of the table using in-memory scan and the non-in-memory portion of the table by reading these rows directly from disk.

When rows are deleted from a table that contains the PF data, the corresponding entries in the IMCUs for these rows are marked as invalid. When new rows are inserted into an in-memory table, they are first stored in a corresponding global journal 112 until they reach a certain threshold, after which the IMCUs are rebuilt. Thus, when scanning an in-memory table, invalid rows from the CUs are skipped and additional rows in the transaction journal are scanned. Transactional consistency is maintained in all cases.

Predicate Pushdown

Query execution is starts with scan operations on the necessary data followed by subsequent database operations (joins, aggregates, etc.) For in-memory scans, IMCUs are decompressed, scanned CU by CU, and then the data items are stitched together to form rows. These rows are served to the query execution engine, so the query execution engine may perform the next particular database operation. Some predicates may be evaluated at the in-memory scan, instead of at the query execution engine, because these predicates can be applied directly on the compressed formats. These predicates are "pushed down" to the scan operation. The query optimizer identifies predicates that may be pushed down to the scan and has these predicates evaluated during the in-memory scan rather than by the execution engine.

Implied Predicates

Some predicates have complex conditions that cannot be evaluated directly against the compressed format of an IMCU. The query optimizer derives implied predicates from these complex predicates using an algorithm that identifies necessary simple conditions from a complex condition. The output of the algorithm may vary based upon the Boolean operations and comparison logic supported by the database system. For example, for complex predicates that involve AND/OR operations, two main traversal functions may call each other recursively to generate implied predicates. The two traversal functions call each other recursively to determine every term of an AND/OR expression that can be simplified into an implied predicate. Similar functionality may be incorporated for additional functionality, including but not limited to, XOR, NAND, and NOR operations.

Consider the following single-table query on table 164, which is populated in volatile memory:

SELECT c1, c3 FROM table164 WHERE c1=1 OR (c1=3 and c3>10);

The complex predicate "c1=1 OR (c1=3 and c3>10)" cannot be evaluated by an in-memory scan directly because the predicate has conditions on multiple columns. However, the conditions may simplified by the query optimizer using the following approach.

In a first pass, the query optimizer determines that the predicate has an OR expression that needs to be simplified for every possible TRUE value of the expression. Then, the query optimizer traverses each condition to determine whether the OR expression may be simplified for repetitive terms. If a constraint for a particular column appears in each term of an OR expression, then the terms may be combined to create an implied predicate. Anytime a constraint is not repeated in multiple terms of an OR expression, the condition may be removed from consideration as an implied predicate.

In the case of the predicate "c1=1 OR (c1=3 and c3>10)", a condition for the particular column c1 exists in every term of the OR expression. Thus, the predicate may be simplified to "c1 IN (1, 3)". This "implied predicate" may be used to filter data during an in-memory scan.

Figure 2A:
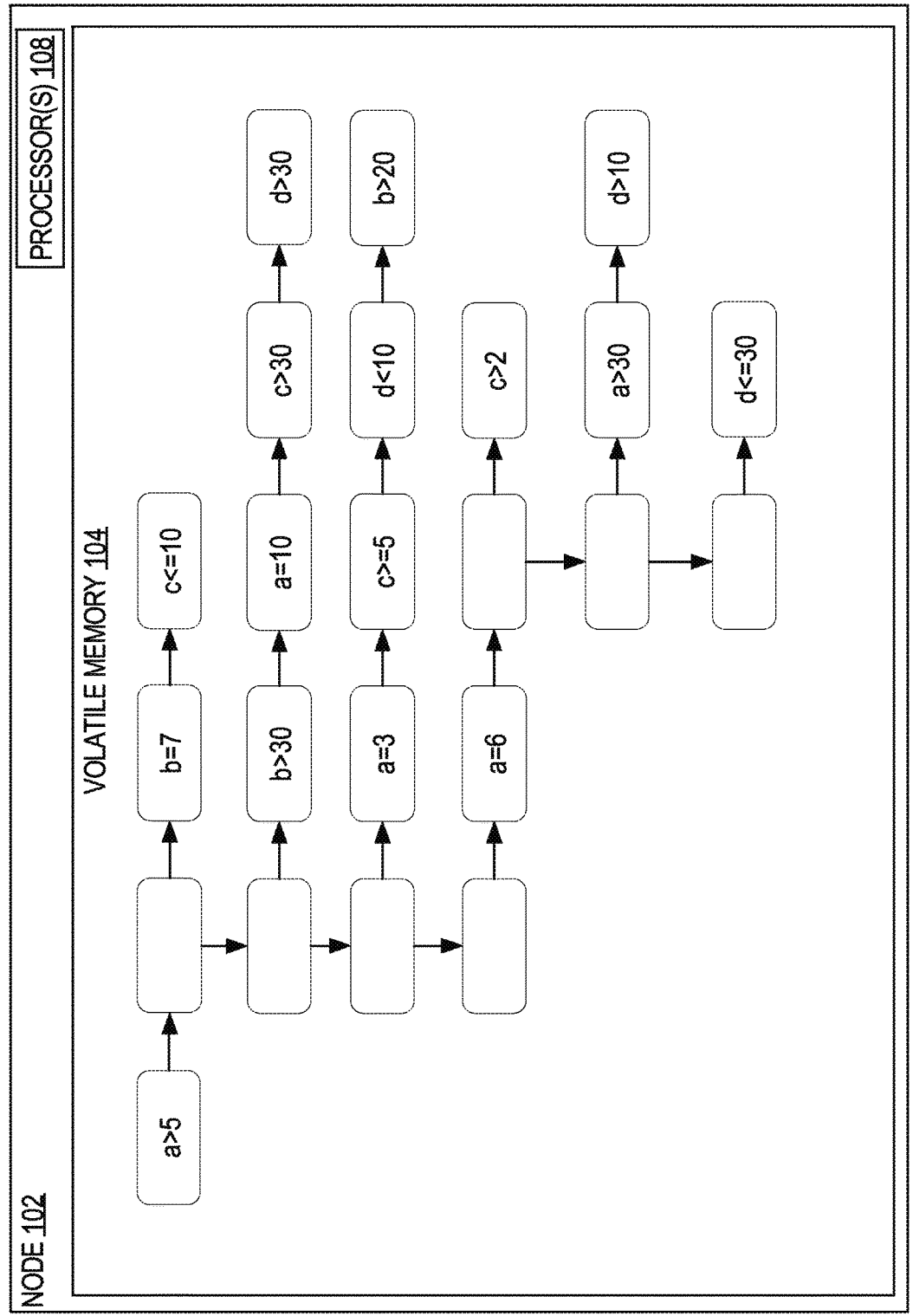

If a constraint for a particular column appears in each term of an AND expression, then those terms may also be simplified into an implied predicate. Unlike an OR expression, the conditions for an AND expression do not need to be removed if there is no repetition. Instead, the conditions are simplified into a single condition that satisfies both conditions. A more complex predicate delineates the process clearly:

SELECT a, b, c, d, FROM Table200 WHERE
a>5 and b=7 and c<=10 and
((b>30 and a=10 and c>30 and d>30) or
(a=3 and c>=5 and d<=10 and b>20) or
(a=6 and c>2 and ((a>30 and d>10) or d<=30)));

FIG. 2A is a block diagram illustrating how a database server instance may break down this query into a series of conditions. Conditions placed in the same lateral dimension represent how a recursive function may be called to simplify AND operators, while a row of conditions spaced in a different vertical dimension represents how a recursive function may be called to simplify OR operations.

In the first pass over the predicate, the query optimizer determines that an AND expression exists, so any terms with conditions on the same column are combined:

"a>5 and b=7 and c<=10 and (XXX)"

XXX is another complex expression, so any terms with conditions on the same column are combined within this expression:

(b>30 and a=10 and c>30 and d>30) or
(a=3 and c>=5 and d<=10 and b>20) or
(YYY);

YYY is another complex expression, so a recursive call is made to simplify any terms with conditions on the same column:

a=6 and c>2 and (ZZZ)

ZZZ is another complex expression, so another recursive call is made to simplify any terms with conditions on the same column:

(a>30 and d>10) or d<=30

FIG. 2B is a block diagram illustrating how an OR expression on the lowest level may be simplified. A "d" column constraint is in both terms of the OR expression, so the query optimizer combines the "d" column conditions into an implied predicate: "d>10 or d<=30". Because the implied predicate is always true, the predicate may be simplified even more to "d is NOT NULL". The "a" column constraint is only in one term of the OR expression, so it is not considered for further implied predicates.

Figure 2C:
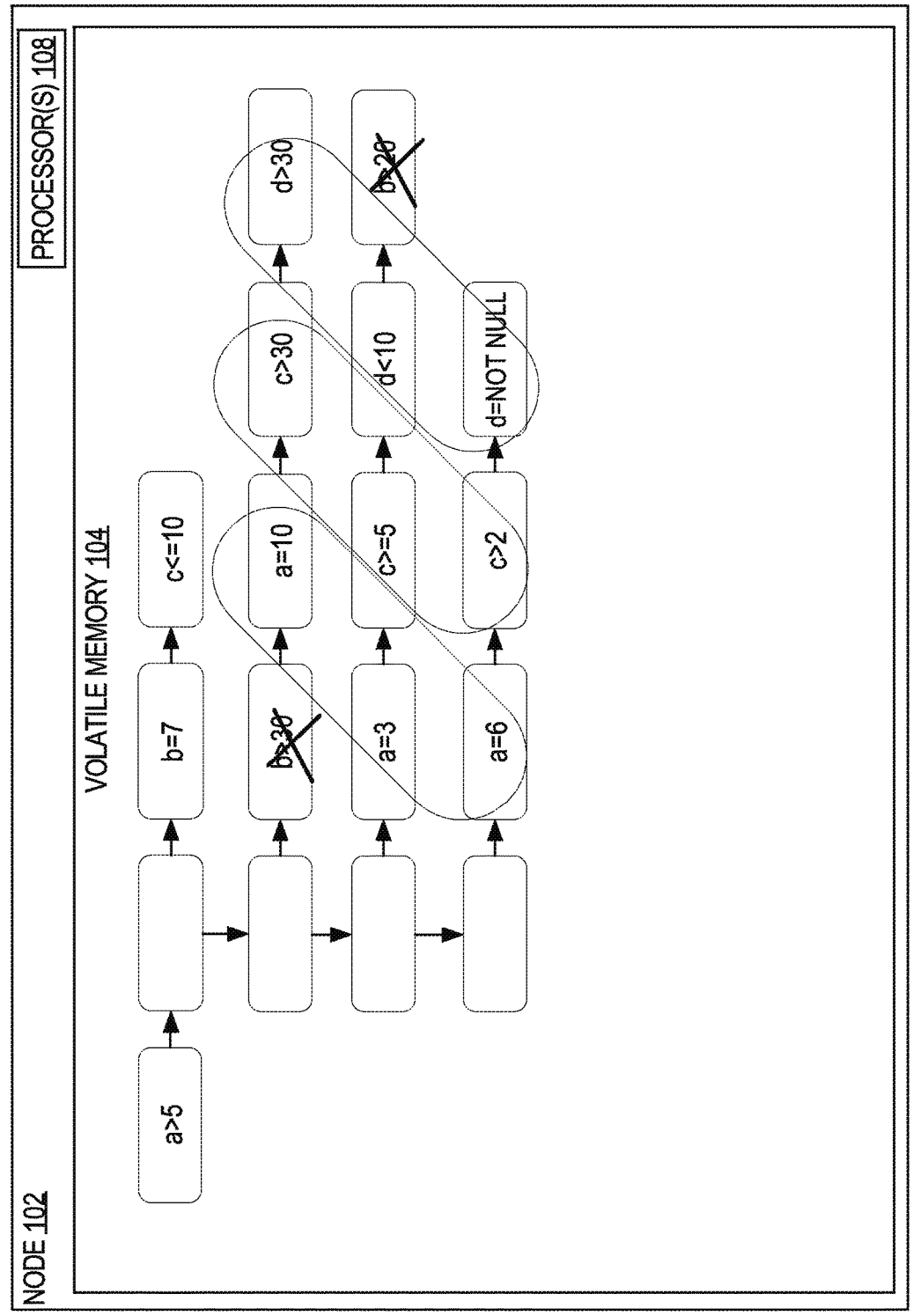

FIG. 2C is a block diagram illustrating how an OR expression on multiple levels may be simplified. The implied predicate "d is NOT NULL" replaces ZZZ. The AND expressions "a=6 and c>2 and d is NOT NULL" cannot be further simplified because there are no conditions with repeated columns. The simplified implied predicate is returned to the next highest recursive function. The implied predicate "a=6 and c>20 and d is NOT NULL" replaces YYY, returning the expression:

(b>30 and a=10 and c>30 and d>30) or
(a=3 and c>=5 and d<=10 and b>20) or
(a=6 and c>2 and d is NOT NULL)

Because a constraint exists on the same column for each term in the OR expression, the query optimizer simplifies these conditions into at least one implied predicate. The conditions with the same column are grouped and simplified as shown. The following implied predicates are created:

'a'=10 or 'a'=3 or 'a'=6 which simplifies to 'a' IN (10, 3, 6);

'c'>30 or 'c'>=5 or 'c'>2 which simplifies to 'c'>2; and

'd'>30 or 'd'<=10 or 'd' is NOT NULL which simplifies to 'd' is NOT NULL;

'b' is not repeated in every term of the OR expression, so no implied predicates are generated for the 'b' column. The implied predicates may be substituted for the (XXX) term.

Figure 2D:
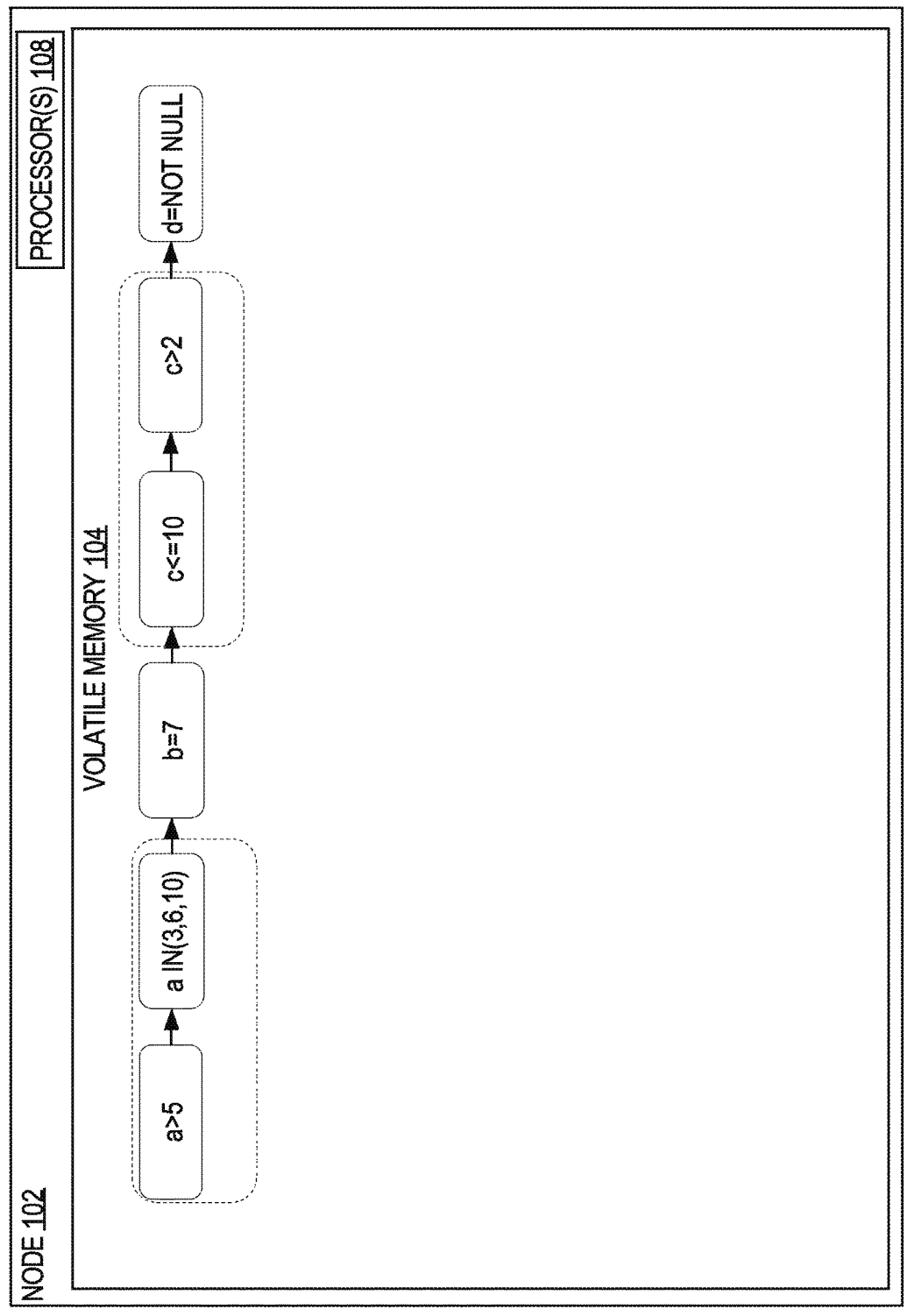

FIG. 2D is a block diagram illustrating how query optimizer simplifies multiple constraints on the same column in an AND expression. The conditions with the same column are grouped and simplified as shown. The following predicates are returned:

'a'>5 and 'a' IN (10, 3, 6), which simplifies to 'a' IN(10, 6);

b=7;

c<=10 and 'c'>2, which simplifies to 'c' BETWEEN 2 and 10;

d is NOT NULL;

These predicates are evaluated against their corresponding CUs for every IMCU during the in-memory scan.

The original complex predicate may not be discarded. After filtering most rows via pruning and predicate filtering, the remaining rows from the IMCUs are stitched together and evaluated against the original complex predicate on a row-by-row basis.

Storage Index Pruning

In some embodiments, a storage index refers to the MIN/MAX values located in a particular CU. When scanning a table, the storage index of a CU may be compared with a single column condition to determine whether any data within a particular CU may contain data elements that satisfy the predicate's necessary condition. If a CU does not have a range of data that can satisfy a predicate's condition, then the IMCU may be pruned from the scan. Removing an IMCU from a table scan because at least one necessary condition cannot be met is referred to herein as storage index pruning.

For example, consider a predicate with the necessary condition c<6. The minimum value of CU c2 is 18. Because none of the data elements in CU c2 can satisfy the predicate's condition, none of the rows (when stitched together) in IMCU 119 can satisfy the predicate's condition. Thus, IMCU 119 may be pruned from the scan.

Some predicates on multiple columns may be evaluated at the same time during the in-memory scan. For 'a' IN(10, 6) AND 'b'=7, storage index pruning is computed for each condition by scanning CU a1 and CU b1 at the same time. Because these conditions are AND-ed, a database server instance may prune an IMCU if the range of values in a corresponding CU cannot meet any single condition.

Storage index pruning is different than partition pruning. For example, assume IMCUs 114, 119 belong to a range partitioning scheme that divides a year into trimesters (January-April, May-August, and September-December). When the table is partitioned, the data from a particular column (called the partition key) is used to determine which partition a row belongs. A query optimizer that is aware of the partition scheme may drop entire partitions from a scan before they are scanned because the partition by definition cannot have data that meets a predicate's condition. In contrast, the min-max values used in storage index pruning are driven by the data as it resides in the CU. During the scan process, each IMCU must still be considered, but some scans may be determined by reading the min-max data prior to actually scanning the data items in the CU. The partitioning scheme of a table is fixed, while the size and range of an IMCU could be different for the same table depending on the system configuration. Therefore, while partition pruning could be determined during compilation, storage index pruning can be performed only during actual execution of the query.

Filter Predicate Evaluation

After performing storage index pruning, simple conditions in each predicate may be evaluated against corresponding CUs. For simple conditions, the condition is recompiled into simple PCODE representations that can be evaluated at runtime. PCODES that are repeatedly evaluated may be cached for quick evaluation of later PCODES.

Figure 3A:
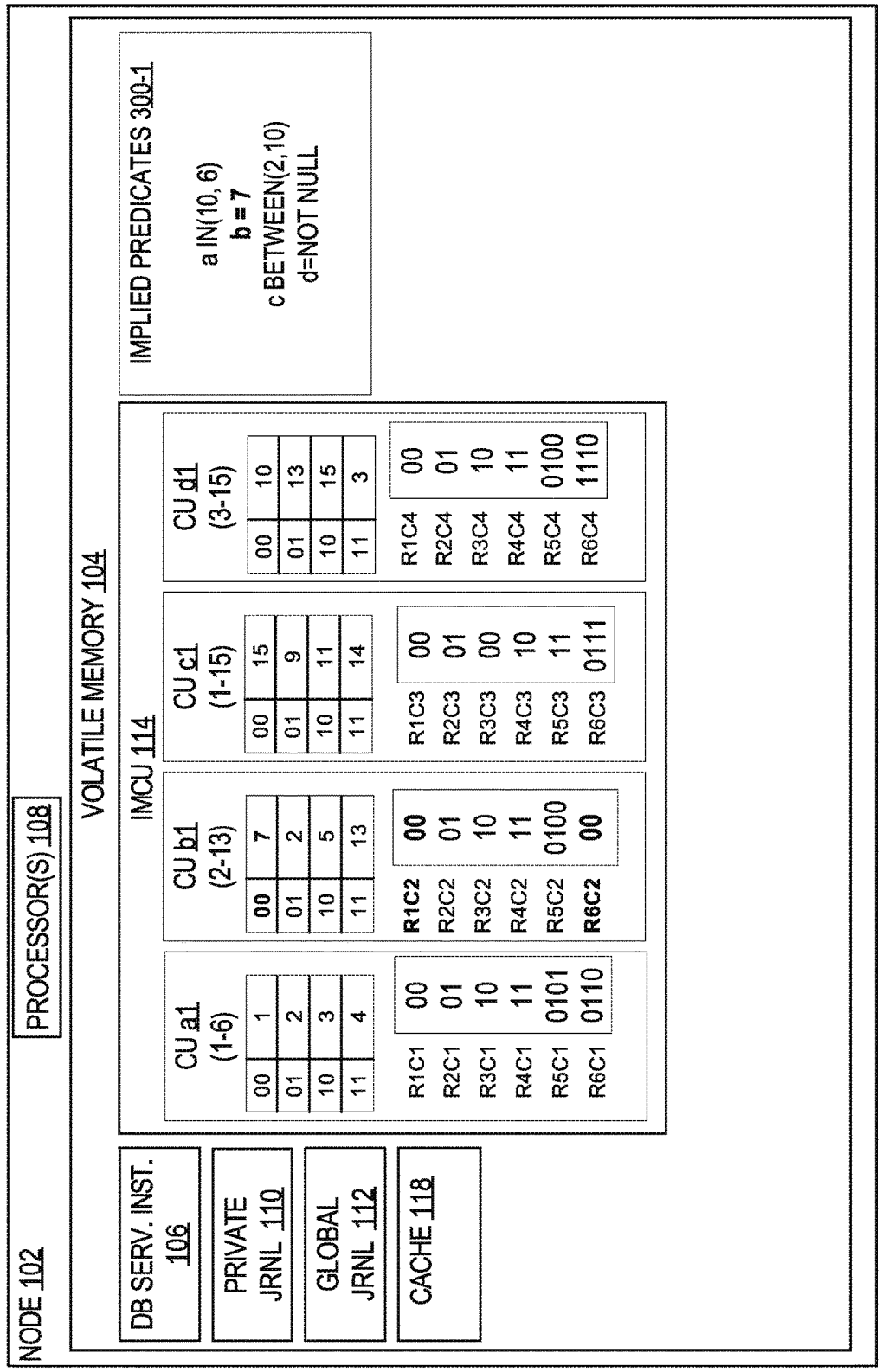
FIG. 3A is a block diagram of a system state of a database system while performing storage index pruning and predicate filtering on compressed in-memory columnar units.

FIG. 3A is a block diagram of a database system that may apply storage index pruning There are predicates on multiple columns, for example 'a' IN(10, 6) AND 'b'=7 AND 'd' is NOT NULL, predicate filtering is computed for each condition by scanning each CU that corresponds to any condition.

Consider a predicate with the condition b=7. Database server instance 106 may use the PCODE to evaluated b=00. The token 00 is then inserted into the condition to be compared against each element in CU b1 to determine if the condition b=7 is met. In this example, the PCODE only requires eight bits to encode, while the condition b=7 requires a much larger word length.

If CU b1 does not have any data items that can satisfy a predicate's condition, then the IMCU 114 may be filtered from further scanning. However in the current example, CU b1 has two data items that satisfy the condition: R1C2 and R6C2.

Figure 3B:
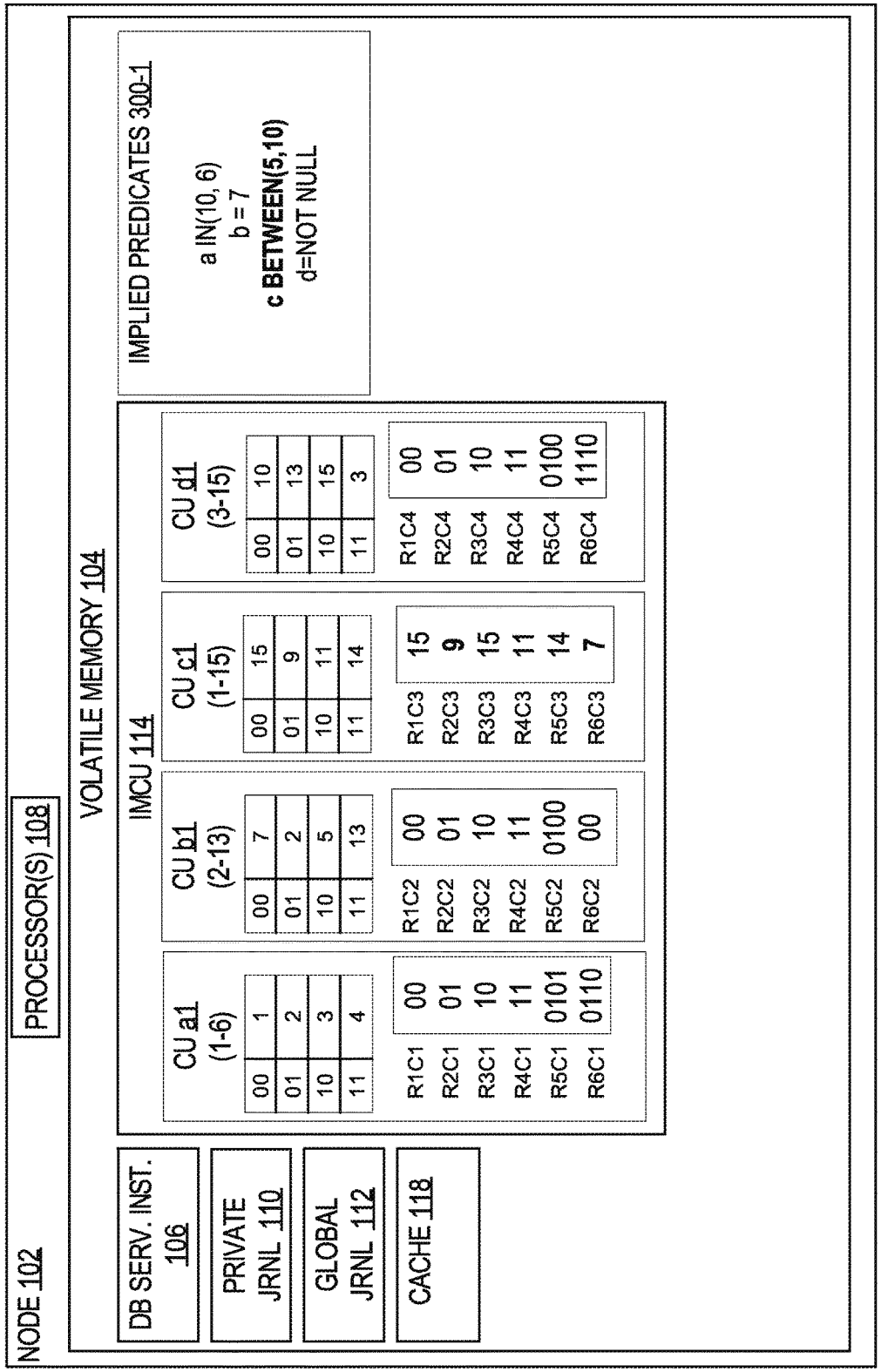
FIG. 3B is a block diagram of a system state of a database system while performing predicate evaluation on decompressed data after most of the data has been filtered.

In some cases, the CU may need to be decompressed in order to evaluate the condition of the predicate against the data items in the CU. Consider a predicate with the condition c BETWEEN(2,10). The data items are decompressed, and the condition is then applied to each data item in CU c1 to determine if the condition c BETWEEN(2, 10) is met. FIG. 3B illustrates performing filter predicates against decompressed data in the in-memory scan. For this particular example, the compression technique could be using an order-preserving dictionary, in which case no decompression is needed. However, the example is illustrative of decompression.

If CU c1 does not have any data elements that can satisfy a predicate's condition, then the IMCU 114 may be filtered from further scanning. In this case, CU c1 has two data items that meet the condition: R2C3 and R6C3.

Figure 3C:
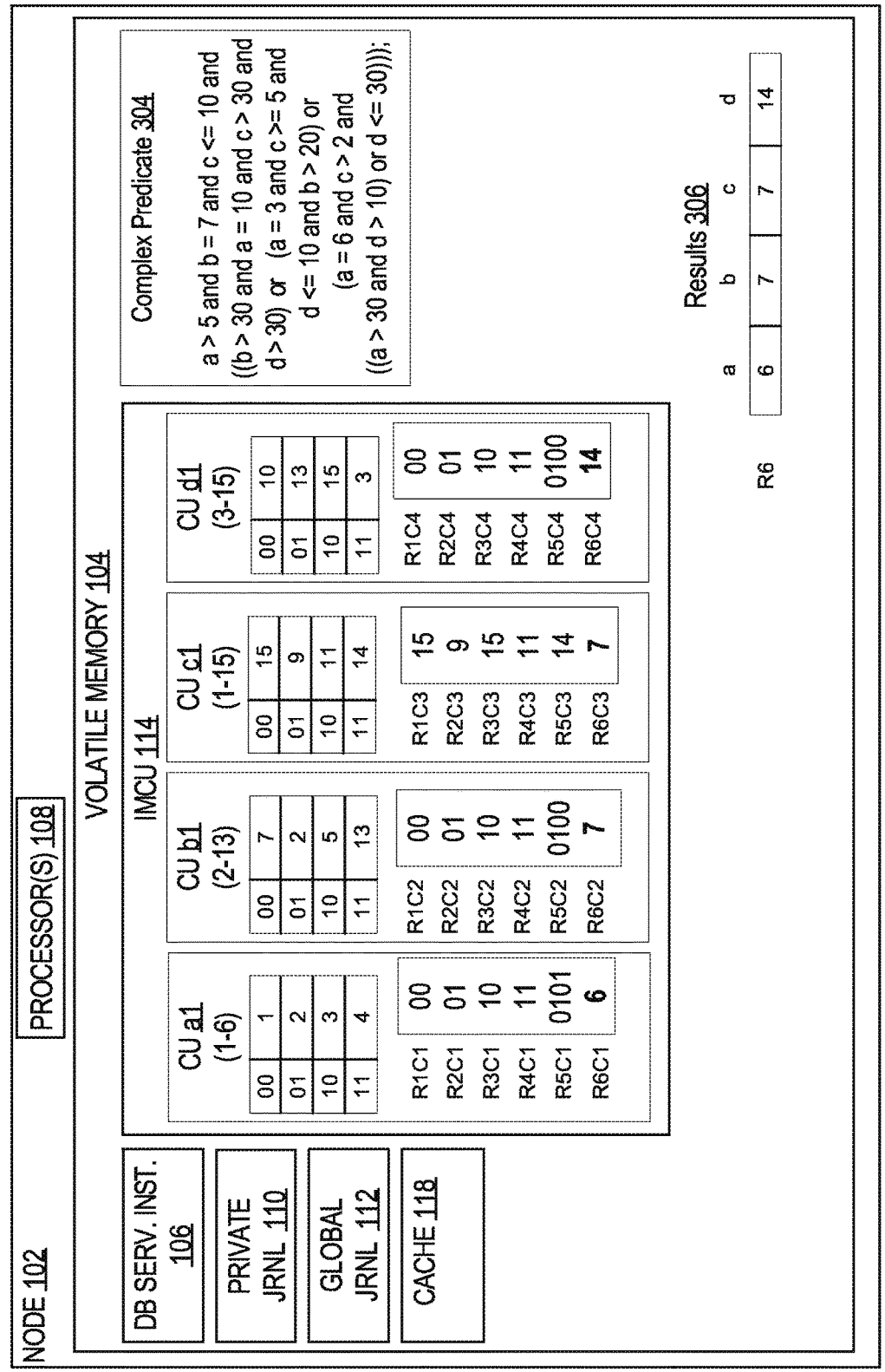
FIG. 3C is a block diagram of a system state of a database system while performing complex predicate evaluation on stitched together row-major data.

The data items from CU a1, b1, and d1 that are in the same rows as the data items that meet the condition for c1 are decompressed, and these data items are stitched with their corresponding data items in the IMCU. Once the rows are stitched, the entire complex predicate may be evaluated against the filtered rows. FIG. 3C illustrates evaluating complex predicates against decompressed rows that are stitched together. In this example, R6 is the only row that needs to be stitched together because all other rows have been filtered. The row stitches to:

R6C1: 6, R6C2: 7, R6C3: 7, R6C4: 14

The complex predicate is evaluated against row R6 to determine if R6 evaluates to true.

a>5 and b=7 and c<=10 and
((b>30 and a=10 and c>30 and d>30) or
(a=3 and c>=5 and d<=10 and b>20) or
(a=6 and c>2 and ((a>30 and d>10) or d<=30)));
R6 has data items that evaluate to true for the complex predicate.

The results 306 that meet the predicate's conditions are aggregated in a single node 102 and sent back to the requesting application.

Distributed Database Cluster

Figure 4:
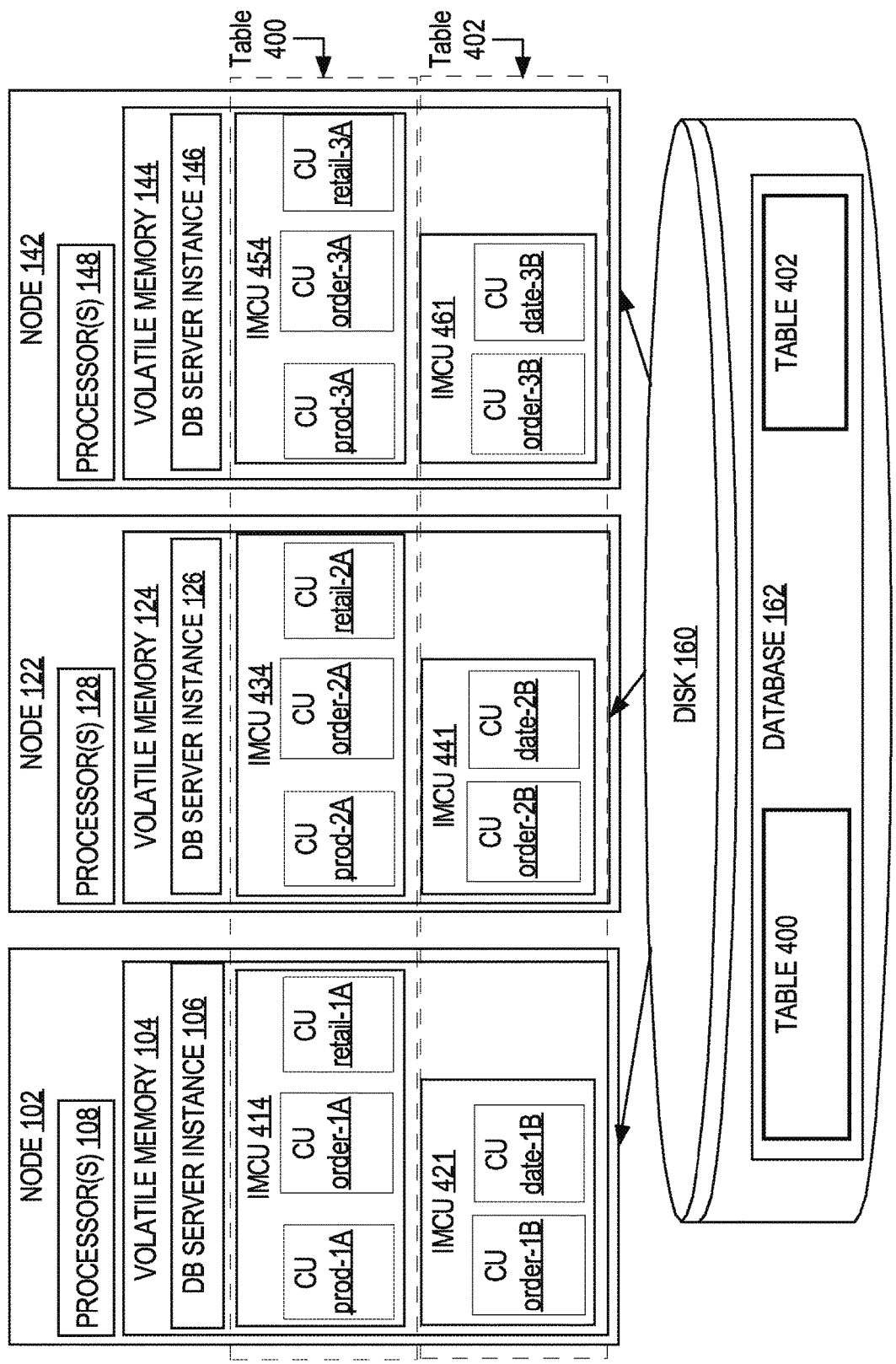
FIG. 4 is a block diagram of a dual format database cluster.

The previous techniques may be applied to a distributed database cluster as well. Referring to FIG. 4, it is a block diagram that depicts a database cluster according to one embodiment. In the embodiment illustrated in FIG. 1, three nodes 102, 122 and 142 have access to the same database 162. For the purpose of illustration, database 162 is shown as stored on a single shared disk 160, but in alternative embodiments may be spread across multiple disks to which each of nodes 102, 122 and 142 have access.

In the embodiment illustrated in FIG. 4, IMCUs 414, 434, 454 contain items extracted from a set of rows of table 400, and IMCUs 421, 441, 461 contain items extracted from a set of rows of table 402. Tables 400 and 402 are stored on disk 160 as PF data.

Within IMCUs 414, 434, and 454 data items from each column of table 400 are stored separately and contiguously as a columnar units.

IMCU 414 includes CU prod-1A, CU order-1A, CU retail-1A;

IMCU 434 includes CU prod-2A, CU order-2A, CU retail-2A; and

IMCU 454 includes CU prod-3A, CU order-3A, CU retail-3A.

Each group of CUs from these IMCUs respectively contains items of table 400 from columns "productID", "orderID", and "retailValue." For simplicity, these columns may be referred to as columns "prod-A", "order-A", and "retail-A", respectively.

Within IMCUs 421, 441, and 461 data items from each column of table 402 are stored separately and contiguously as columnar units.

IMCU 421 includes CU order-1B, CU date-1B;
IMCU 441 includes CU order-2B, CU date-2B; and
IMCU 461 includes CU order-3B, CU date-3B.

Each group of CUs from these IMCUs respectively contains items of table 402 from columns "orderID" and "date." For simplicity, these columns may be referred to as columns "order-B" and "date-B", respectively.

Population Modes

Various techniques may be used to populate tables in-memory in a shared-disk cluster. For example, according to one embodiment, a shared-disk cluster supports a DUPLICATE mode and a DISTRIBUTE mode.

Under DUPLICATE mode, all the IMCUs are populated on at least two instances. This provides fault tolerance in case one of the instances goes down. The DUPLICATE ALL mode populates all the IMCUs on all instances; this provides full fault tolerance.

In one embodiment, the DISTRIBUTE mode has three options: distribution by PARTITION, by SUBPARTITION, or by ROWID RANGE. The DISTRIBUTE AUTO option lets the database server choose the distribution method.

The DISTRIBUTE mode provides a way to efficiently use the combined in-memory areas 600-1, 600-2, 600-3 of all nodes and access the data using parallel queries on the in-memory tables. However, if the query is executed serially on a single instance, there will be disk I/O since parts of the table are only populated in-memory on other nodes. Executing a query in parallel while some nodes are in use by other processes will also result in disk I/O. Thus, even though a table may be fully populated in-memory in a shared-disk cluster, it is possible to incur disk I/O depending on the execution plan. Some execution plans may result in inter-node communication. These execution plans seek to limit the amount of inter-process communication by pushing down the predicates to the in-memory scanning process, and filtering out data before rows are transferred between processes.

Join Query in a Distributed Cluster

One of the most basic operations performed against data in a database is the join operation. A join is used to combine multiple tables, so data from those tables may be selected in a query. A query that joins two tables specifies how the tables are joined using a "join key". For example, a query may specify that rows in a first table only join with rows in a second table when a row in the first table has particular column with a value in common with a particular column of a row in the second table. The column name that corresponds to columns from two or more tables that contain data items to be compared is referred to as the "join key."

There are many methods for performing a join comparison, but the most common for performing a matching comparison is a hash-join. In a distributed cluster, a hash join involves scanning a first in-memory table and hashing the data items from the join key. A new distributed table referred to as a build table is created based on the organization of the hashed data. Then, the second table in the join query referred to as the probe table is scanned and hashed on the join key. Each node may easily compare data items from the probe table with data items from the build table because the two tables are organized according to the same hash scheme.

The comparison cost is amortized by the data being redistributed into distributed build and probe tables on different nodes before performing the comparison. This redistribution of data can have a significant cost, especially, since a join query is not necessarily limited to joining two tables. For example, a database may have a "fact table" object and multiple "dimension table" objects. The fact table has a large number of rows with multiple columns for each row, while the dimension tables may comprise only a few columns. The fact table and dimension tables are likely organized so one or more of their columns are similar. For example, one dimension table may have a DEPARTMENT column in common with the fact table, while another dimension table may have a DATES column in common with the fact table. Both the fact table and the dimension tables may be partitioned along one or more of these similar columns. A join query (sometimes referred to as a "star query") may join multiple dimension tables to the fact table.

Join Filters

A join query may include a "join predicate" and one or more additional predicates. The join predicate joins the two tables with a comparison operator (such as an "=") and cannot be easily evaluated without redistributing data from two tables. The query optimizer may select a query execution plan that applies a join filter. A join filter is an internally generated predicate that can be pushed down to in-memory scan operations for tables involved in a join. During query execution, the cluster performs an in-memory scan of a first table. Any predicates and implied predicates may be applied to filter data items from that table to obtain a set of intermediate results. The intermediate results from the first table may be used to generate a join filter that tracks distinct values from the intermediate results that correspond to the join key. The join filter, then acts like a predicate filter for scanning the second in-memory table. The join filter is pushed from the execution engine layer to the in-memory scan layer for evaluation during an in-memory scan of the second table, similar to how implied predicates and filter predicates may be pushed down to the scan.

When scanning the second table, data from the second table is only decompressed, stitched, and transferred to other nodes in the cluster if the data passes through the join filter in addition to any other filters that may be applied to the second table during an in-memory scan of the second table. In many cases, applying filter predicates before the join comparison reduces the number of rows distributed for the second table by an order of magnitude.

Selecting Among Tables to Create Join Filter

Join filters provide extremely high performance improvement for certain classes of query such as star queries where dimension tables have filter predicates that reduce the rows returned from the scan of the fact table by several orders of magnitude. The query optimizer determines the cost of executing multiple query execution plans with different tables assigned as the first table used to create the join filter. For star queries, the query optimizer selects the query execution plan that identifies the dimension table as the first table used to create the join filter because the cost of filtering data from the dimension table first is significantly less.

The query optimizer may determine costs of executing different query execution plans by estimating based off of table statistics and the selectivity of different query predicates. Predicates with a high selectivity against a particular table often determine which table to generate the join filter from. In the case of estimating the cost of creating a join filter from a dimension table, often only distinct values are used to create the join filter. In comparison, the fact table often has fewer distinct values but many repetitions of those distinct values. Thus, creating a join filter from the fact table would result in more computations on the same values.

In applying the join-filter, during an in-memory scan of the second table, the database cluster filters repetitive values from the join key of the fact table using the join filter before these values are stitched, transferred via inter-process communication, or further evaluated in the join comparison. For example, consider the fact table 400 and the dimension table 402 from FIG. 4. Assume node 102 receives the query:

SELECT*FROM table400, table402
WHERE table400.orderID=table402.orderID
AND table402.date between '01-01-2014' and '12-31-2014';

After performing a cost analysis, the query optimizer selects a query execution plan that pushes down the predicate "table402.date between '01-01-2014' and '12-31-2014'" to the first in-memory scan because the most values corresponding to the join key will be filtered after applying this filter predicate.

Creating the Join Filter from the First Table

When creating a build table for performing the hash-join, the database servers create a join filter that tracks unique values from the build table. A join filter is like a Bloom filter in that it is a bitmap of hash values. Every time a filtered value from the first table hashes to a particular bit, the bit is flipped. Subsequent, hashes to the same bit do not cause any additional flips. The bitmap stores an array of distinct hash values where multiple data items may hash to the same bit.

Comparing any particular hash value to the join filter may result in a false positive. With a properly sized join filter, the number of false positives may be minimized. However, a small number of false positives is to be expected in order to optimize space versus performance. An optimal join filter balances the size of the filter with the number of distinct values filtered.

Figure 5A:
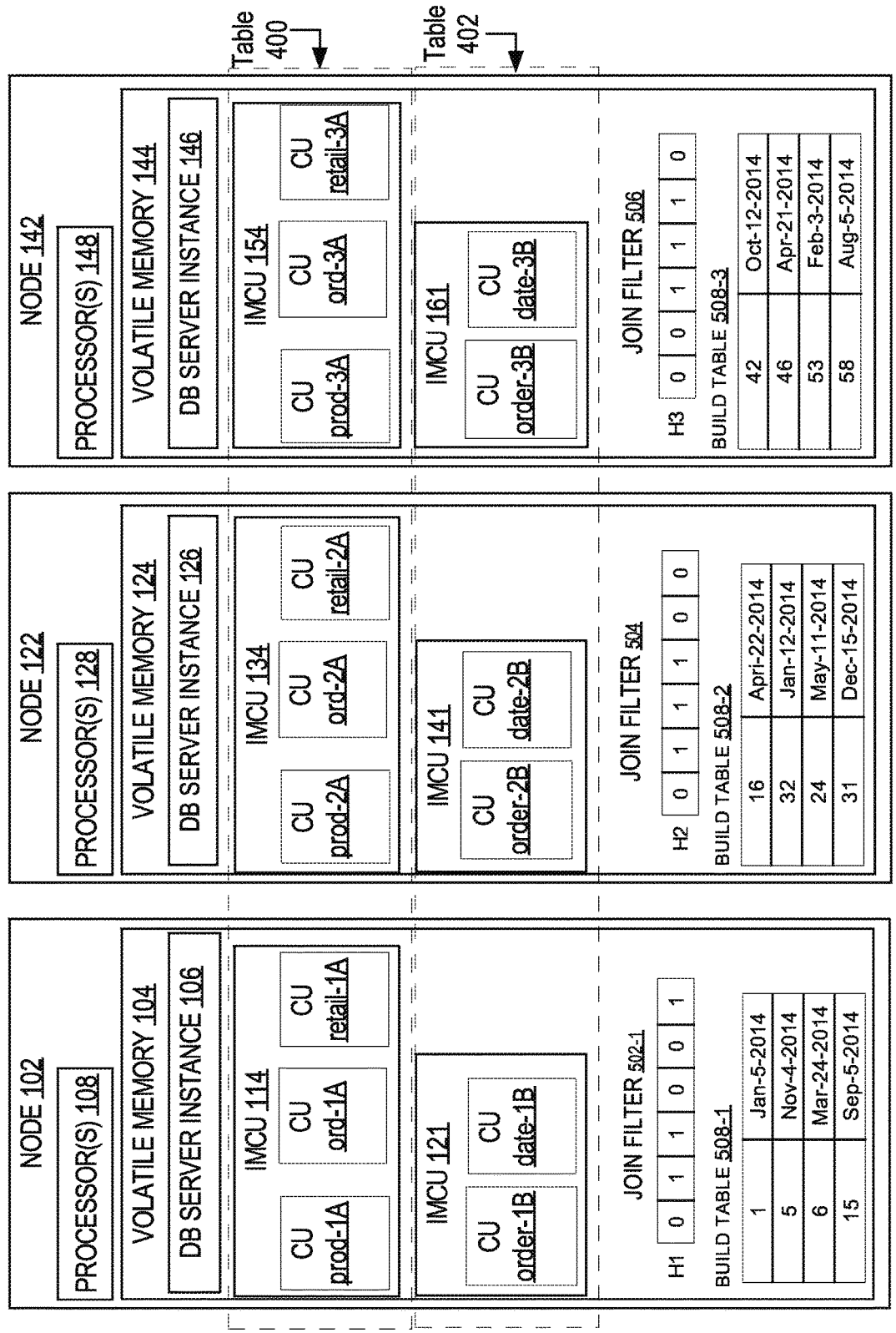
FIG. 5A is a block diagram of a database cluster performing a first step in a hash-join method that includes generating a join filter.

Continuing the example from FIG. 4, FIG. 5A is an example join filter created from table 402. The data from IMCUs 414, 434, and 454 are filtered in parallel based on the predicate: table402.date between '01-01-2014' and '12-31-2014.' To perform a hash join, each node 102, 122, 142 executes an initial in-memory scan of table 402. During the in-memory scan, each node 102, 122, 142 pushes the valid predicates down to in-memory scan and performs storage index pruning on any predicates that may be applied to a single column. During the in-memory scan, filter predicates are evaluated against individual CUs.

The filtered data items are then stitched together into rows, and any complex predicates are evaluated. The remaining rows are used to create a join filter based off of distinct data items in the join key column. These rows are sent to target nodes assigned to host data for distinct portions of the build table. The target nodes then each use the filtered rows to create both the build tables 508-1, 508-2, 508-3 and the join filters 502, 504, 506.

Figure 5B:
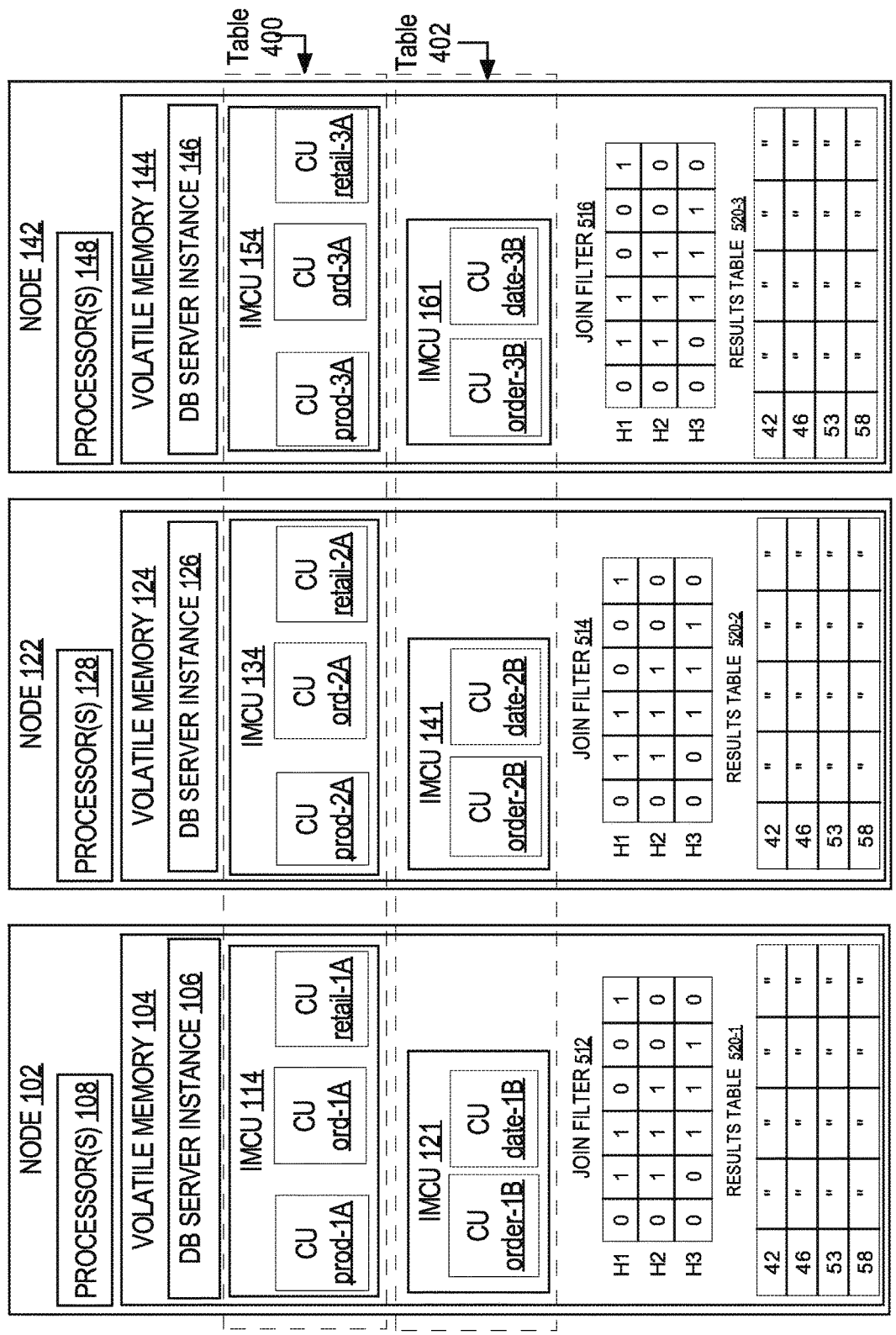
FIG. 5B is a block diagram of a database cluster performing a second set in a hash-join method that includes filtering data with the join filter.

Once the join filters are complete, the join filters are combined into a single join filter that may be applied to table 400 when creating the probe table. FIG. 5B is a block diagram of a combined join filter 510 copied in each node in a database cluster. In this example embodiment, the join filters are combined using an AND operation, but in other embodiments, the join filter may be combined using an OR operation.

Applying the Join Filter to the Second Table

Table 400 is then scanned and any filters that may be applied to table 400 are applied. Table 400 is filtered through the join filter 510. The data items from the join key of table 400 are hashed using the same hash function used to create the join filter 510. In this example, three different hash functions may have been used (corresponding to join filter 502, 504, and 506), so each data item from table 400 may need to be hashed using three different hash functions. The hash values are then compared to the three bitmaps (H1, H2, H3) in the join filter, and any hash values that are compared against a '0' are filtered out. In this example, the join filter 510 was the only filter that may be applied to table 400 because the query did not comprise any additional predicates. When creating the probe table, data items from table 400 are only stitched together and/or distributed to other nodes in the cluster if the data passes through all the predicate filters including the join filter.

To finish the join method, the filtered results of table 400 are stitched together and hashed according to the same hash scheme used to create the build table 508. Each node then sends the resulting stitched together rows to a corresponding target node that is assigned to host a distinct portion of the probe table. The data items from the join key of the probe table (i.e. generated from table 400) are compared to the data items of the join key from the build table (i.e. generated from table 402) using the join predicate. Results 520-1, 520-2, 520-3 are aggregated and sent to a single node (i.e. node 102) to be relayed to the requesting application.

Partition Join Filter

Figure 6A:
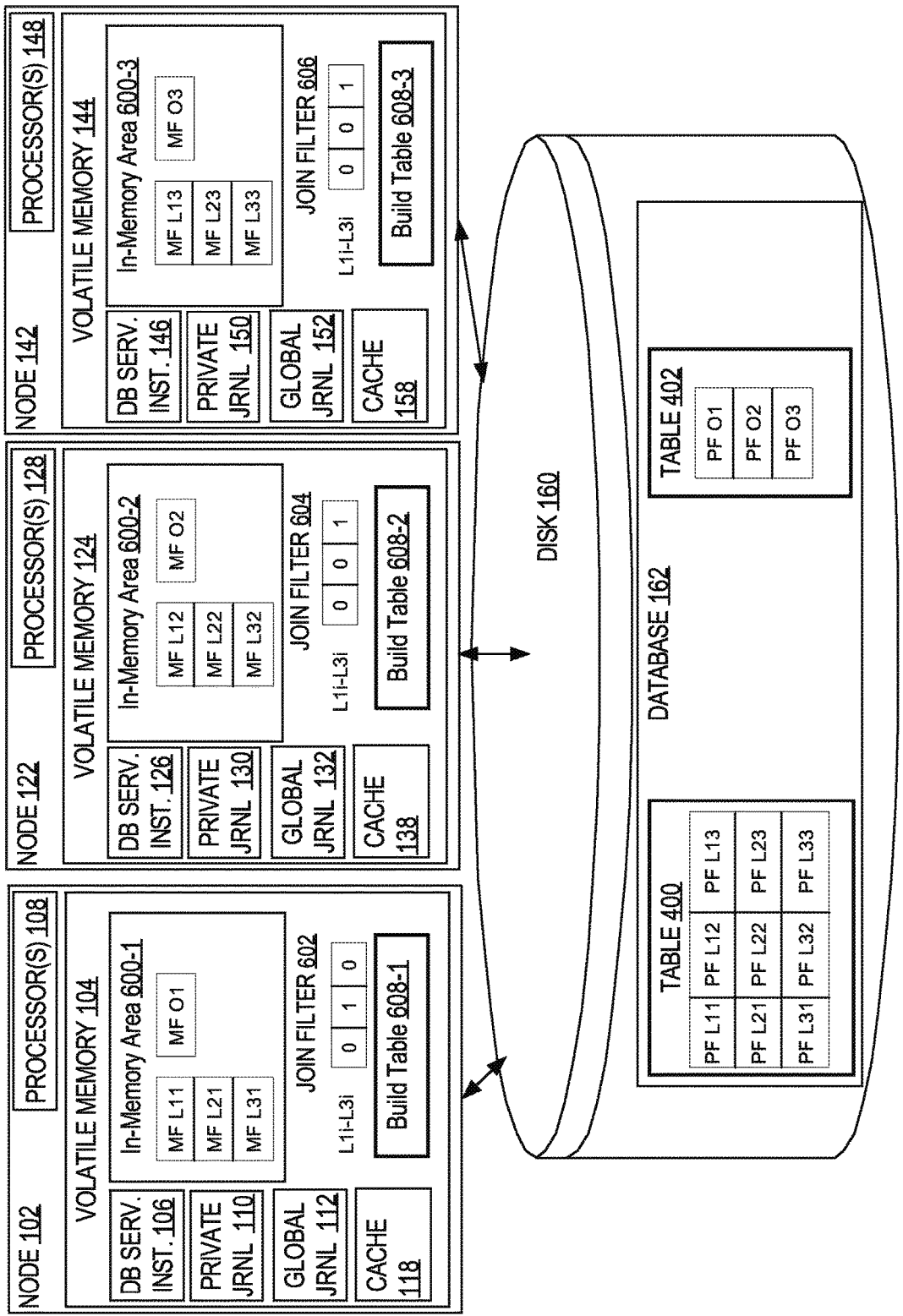
FIG. 6A is a block diagram of a database cluster generating a partition based join filter.

In a distributed cluster, database objects (i.e. table 400, table 402) may be partitioned on disk and one of those partition dimensions may be used to distribute the data in volatile memory. In FIG. 6A table 400 and table 402 are partitioned, and they are distributed in volatile memory based on the same partition key "orderID."

Table 400 is hash partitioned on an "orderID" column ($L_{1i}$-$L_{3i}$) and sub-partitioned on a "retail_value" column ($L_{j1}$-$L_{j3}$). Table 402 is only partitioned on an "orderID" column ($O_1$-$O_3$).

Consider the query:

SELECT*FROM table400, table402
WHERE table400.orderID=table402.orderID
AND table402.date between '01-01-2014' and '12-31-2014';

The query optimizer is aware of the partition dimension and determines that the lowest cost query execution plan includes creating a join filter that corresponds to the partition dimension (from the "orderID" key). The data items from IMCUs 114, 134, and 154 are filtered in parallel based on the predicate: table402.date between '01-01-2014' and '12-31-2014.' To perform a hash join, each node 102, 122, 142 executes an initial in-memory scan of table 402. During the in-memory scan, each node 102, 122, 142 pushes the valid predicates down to in-memory scan and performs storage index pruning on any simple predicates. During the in-memory scan, filter predicates are evaluated.

The filtered data items are then stitched together into rows, and any complex predicates are evaluated. The left over data items in the join key column are used to create a join filter. These rows are sent to target nodes assigned to host data for distinct portions of the build table. The target nodes then each use the filtered rows to create both the build tables 608-1, 608-2, 608-3 and the join filters 602, 604, 606. Note the join filter has three bits corresponding to the three hash partitions of the orderID partition key for table 400.

Figure 6B:
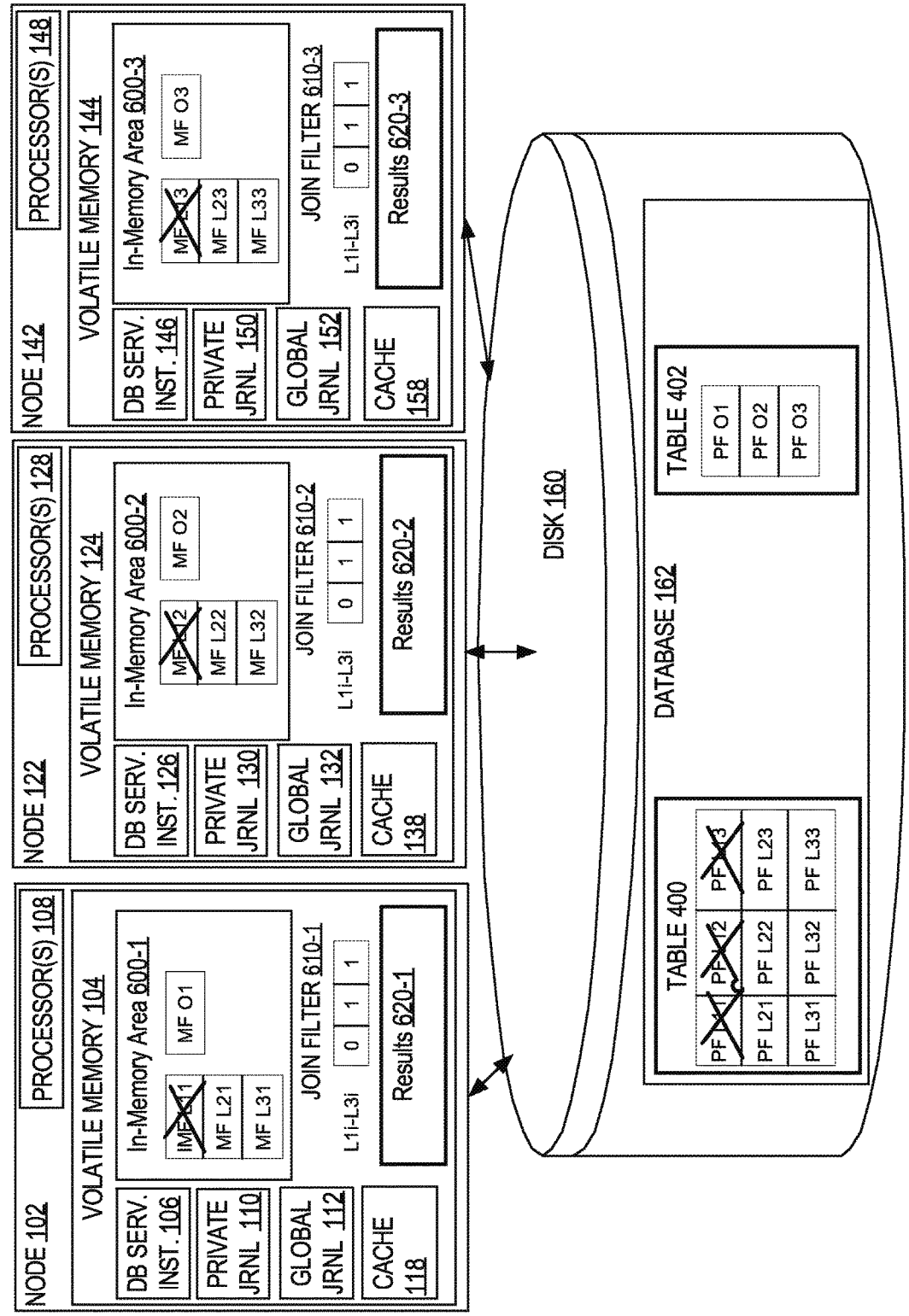
FIG. 6B is a block diagram of a database cluster applying the partition based join filter to prune partitions.

Once the join filters are complete, the join filters 602, 604, 606 are combined into a single join filter 610 that may be applied to table 400 when creating the probe table. FIG. 6B is a block diagram of a combined join filter copied in each node in a database cluster. In this example embodiment, the join filters 602, 604, 606 are combined using an OR function. Table 400 is then scanned and any filters that may be applied to table 400 are applied.

Table 400 is filtered through the join filter 610, which corresponds to the "orderID" partitions ($L_{1l}$-$L_{3l}$). Table 400 is distributed in memory along the partitions of "product_id", so partitions that do not pass join filter 610 are pruned. Depending on the query execution plan selected by the query optimizer, this means those partitions are not stitched together, transferred in inter-process communication (i.e. MF L11, MF L12, MF L13) or redistributed through disk I/O (i.e. PF L11, PF L12, PFL13).

Table 400 is hashed according to the same hash used to create the build table 608. Each hashed data item from the join key of the probe table (i.e. generated from table 400) is compared to the data items of the join key from the build table (i.e. generated from table 402). Results 620-1, 620-2, 620-3 are aggregated and sent to a single node (i.e. node 102) to be relayed to the requesting application.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
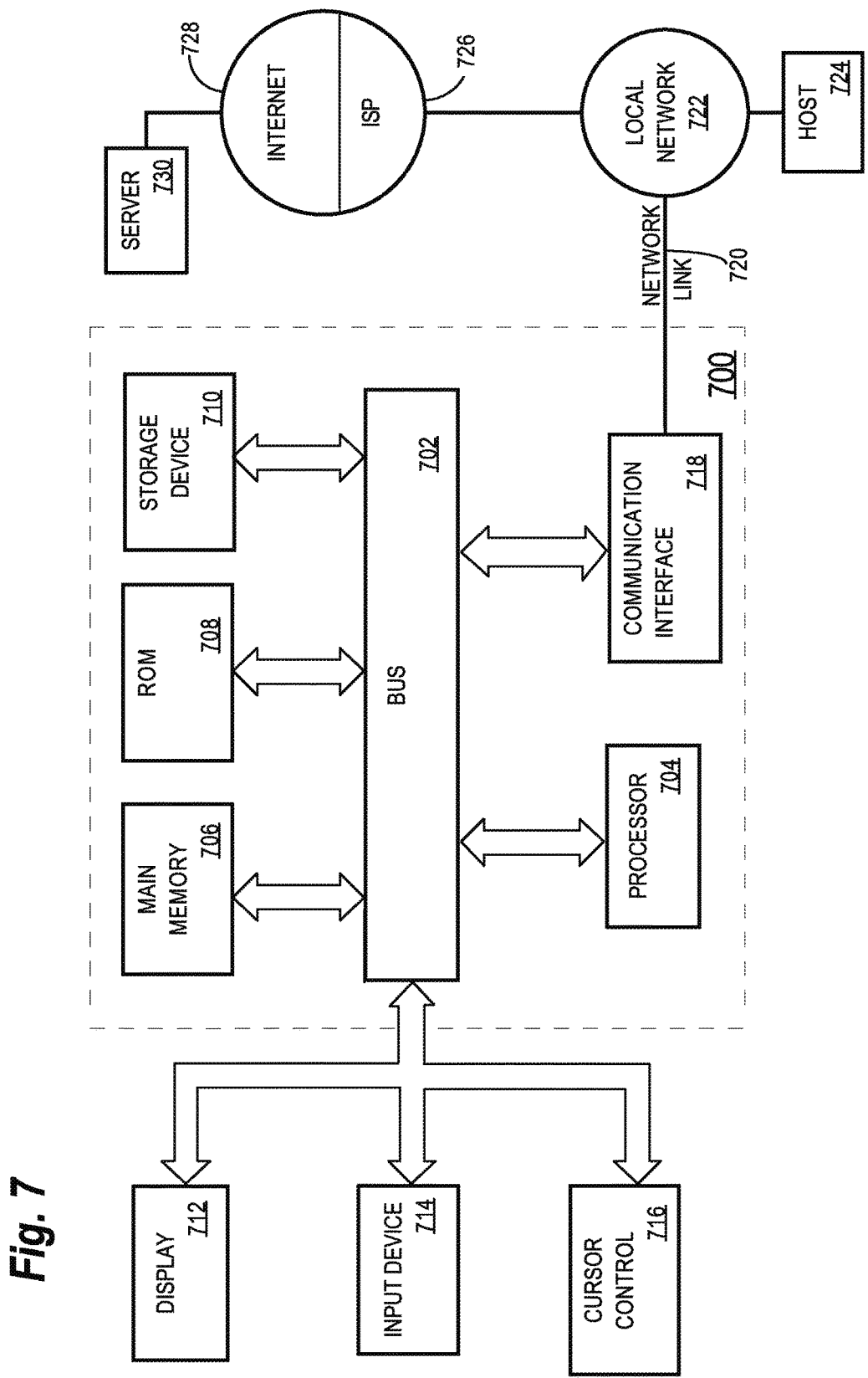
FIG. 7 is a block diagram illustrating a computer system that may be used to implement the techniques described herein.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    prior to receiving a query, with at least one predicate, that requires work to be performed on a first table, performing the steps of:
        dividing data from the first table into a plurality of chunks;
        populating, into a volatile memory of at least one host node, the plurality of chunks;
        compressing each given chunk of the plurality of chunks into a given plurality of columnar units;
    in response to receiving the query with the at least one predicate, wherein the query with at least one predicate is a join query with a join key that corresponds to a first column from the first table and a second column from a second table, performing:
        generating, from the at least one predicate, a condition to evaluate against a particular columnar unit;
        wherein the particular columnar unit is a columnar unit from the given plurality of columnar units that were generated from a given chunk of the plurality of chunks;
        wherein the particular columnar unit stores compressed values from a portion of the first column of the first table;
        during an in-memory scan of at least a portion of the first table, without decompressing the compressed values in the particular columnar unit, comparing data from the particular columnar unit with the condition;
        based on the comparison, filtering data items from the particular columnar unit to produce a first set of intermediate results for the query;
        comparing data items from a join key of a second set of intermediate results, created after applying a hash function used in a hash join to values from the second column of the second table, to the data items from the join key of the first set of intermediate results to generate a set of results for the join query;
    wherein the method is performed by one or more nodes.

2. The method of claim 1, wherein the method further comprises:
    stitching data items from other columnar units, that were generated from the given chunk and that are associated with the particular columnar unit, to form the first set of intermediate results for the query.

3. The method of claim 1, wherein the method further comprises:
    evaluating the at least one predicate against the first set of intermediate results for the query to compute a set of results for the query.

4. The method of claim 1,
    wherein the at least one predicate includes a plurality of conditions;
    wherein the plurality of conditions includes at least two conditions that compare values to data items from the first column;
    wherein generating from the at least one predicate the condition to evaluate against the particular columnar unit includes the steps of:
        (a) combining the at least two conditions that compare values to data items from the first column into a single necessary condition; and
        (b) removing any particular condition that is not necessary for the at least one predicate to evaluate to true.

5. The method of claim 4, wherein the method further comprises repeating the steps of combining and removing to simplify more than two conditions that compare values to data items from the first column.

6. The method of claim 1,
    wherein prior to receiving the query, the method further comprises:
        identifying a range of values stored in the particular columnar unit;
    wherein the method further comprises, in response to receiving the query with the at least one predicate, performing:
        comparing the range of values with the condition, and
        skipping predicate evaluation on the given plurality of columnar units that were generated from the given chunk corresponding to the particular columnar unit that does not have a value in the range specified by the condition.

7. The method of claim 1, further comprising, in response to receiving the query with the at least one predicate, performing:
    compressing some of the data from the condition according to the same compression technique used to compress the particular columnar unit;

wherein during the in-memory scan, a set of compressed data items from the particular columnar unit are compared with the data compressed from the condition.

8. The method of claim 1,
wherein the method further comprises, in response to receiving the query with the at least one predicate, performing:
applying the hash function used in the hash join to create a filter of distinct values based on the join key from the first set of intermediate results;
pushing the filter to an in-memory scan of the second table in the join query;
prior to comparing the data items from the second table to the first set of intermediate results, applying the filter to the in-memory scan of the second table to generate the second set of intermediate results.

9. The method of claim 8, wherein:
the at least one host node includes multiple host nodes;
the filter is applied to the second table prior to distributing the second set of intermediate results via inter-process communication;
the method further comprises:
distributing the first set of intermediate results among the host nodes; and
distributing the second set of intermediate results, via inter-process communication, based on how the first set of intermediate results are distributed among the host nodes.

10. The method of claim 8, wherein the method further comprises:
prior to creating the filter, determining from the join query with at least one predicate, which table of the first table and the second table comprises a dimension table based on predicate selectivity;
based on the determining, selecting the dimension table for creating the filter.

11. One or more non-transitory storage media storing instructions which, when executed by one or more computing devices, cause performance of a method comprising the steps of:
prior to receiving a query, with at least one predicate, that requires work to be performed on a first table, performing the steps of:
dividing data from the first table into a plurality of chunks;
populating, into a volatile memory of at least one host node, the plurality of chunks;
compressing each given chunk of the plurality of chunks into a given plurality of columnar units;
in response to receiving the query with the at least one predicate, wherein the query with at least one predicate is a join query with a join key that corresponds to a first column from the first table and a second column from a second table, performing:
generating from the at least one predicate a condition to evaluate against a particular columnar unit;
wherein the particular columnar unit is a columnar unit from the given plurality of columnar units that were generated from a given chunk of the plurality of chunks;
wherein the particular columnar unit stores compressed values from a portion of the first column of the first table;
during an in-memory scan of at least a portion of the first table, without decompressing the compressed values in the particular columnar unit, comparing data from the particular columnar unit with the condition;
based on the comparison, filtering data items from the particular columnar unit to produce a first set of intermediate results for the query;
comparing data items from a join key of a second set of intermediate results, created after applying a hash function used in a hash join to values from the second column of the second table, to the data items from the join key of the first set of intermediate results to generate a set of results for the join query.

12. The one or more non-transitory storage media storing instructions of claim 11, when executed by one or more computing devices, further causing the performance of:
stitching data items from other columnar units, that were generated from the given chunk and that are associated with the particular columnar unit, to form the first set of intermediate results for the query.

13. The one or more non-transitory storage media storing instructions of claim 11, when executed by the one or more computing devices, further causing the performance of:
evaluating the at least one predicate against the first set of intermediate results for the query to compute a set of results for the query.

14. The one or more non-transitory storage media storing instructions of claim 11,
wherein the at least one predicate includes a plurality of conditions;
wherein the plurality of conditions includes at least two conditions that compare values to data items from the first column;
wherein generating from the at least one predicate the condition to evaluate against the particular columnar unit includes the steps of:
(a) combining the at least two conditions that compare values to data items from the first column into a single necessary condition; and
(b) removing any particular condition that is not necessary for the at least one predicate to evaluate to true.

15. The one or more non-transitory storage media storing instructions of claim 14, wherein the instructions, when executed by the one or more computing devices, further cause the steps of repeating the steps of combining and removing to simplify more than two conditions that compare values to data items from the first column.

16. The one or more non-transitory storage media storing instructions of claim 11,
wherein prior to receiving the query, the instructions, when executed by the one or more computing devices, further cause the step of:
identifying a range of values stored in the particular columnar unit;
wherein in response to receiving the query with the at least one predicate, the instructions, when executed by the one or more computing devices, further cause the steps of:
comparing the range of values with the condition, and skipping predicate evaluation on the given plurality of columnar units that were generated from the given chunk corresponding to the particular columnar unit that does not have a value in the range specified by the condition.

17. The one or more non-transitory storage media storing instructions of claim 11, wherein in response to receiving the query with the at least one predicate, the instructions, when executed by the one or more computing devices, further causes steps of:

compressing some of the data from the condition according to the same compression technique used to compress the particular columnar unit;

wherein during the in-memory scan, a set of compressed data items from the particular columnar unit are compared with the data compressed from the condition.

18. A system comprising one or more computing devices configured to perform a process, comprising:

prior to receiving a query, with at least one predicate, that requires work to be performed on a first table, performing the steps of:

dividing data from the first table into a plurality of chunks;

populating, into a volatile memory of at least one host node, the plurality of chunks;

compressing each given chunk of the plurality of chunks into a given plurality of columnar units;

in response to receiving the query with the at least one predicate, wherein the query with at least one predicate is a join query with a join key that corresponds to a first column from the first table and a second column from a second table, performing:

generating from the at least one predicate a condition to evaluate against a particular columnar unit;

wherein the particular columnar unit is a columnar unit from the given plurality of columnar units that were generated from a given chunk of the plurality of chunks;

wherein the particular columnar unit stores compressed values from a portion of the first column of the first table;

during an in-memory scan of at least a portion of the first table, without decompressing the compressed values in the particular columnar unit, comparing data from the particular columnar unit with the condition;

based on the comparison, filtering data items from the particular columnar unit to produce a first set of intermediate results for the query;

comparing data items from a join key of a second set of intermediate results, created after applying a hash function used in a hash join to values from the second column of the second table, to the data items from the join key of the first set of intermediate results to generate a set of results for the join query.

19. The system of claim 18, wherein the process further comprises:

evaluating the at least one predicate against the first set of intermediate results for the query to compute a set of results for the query.

20. The system of claim 18, wherein the at least one predicate includes a plurality of conditions;

wherein the plurality of conditions includes at least two conditions that compare values to data items from the first column;

wherein generating from the at least one predicate the condition to evaluate against the particular columnar unit includes the steps of:

(a) combining the at least two conditions that compare values to data items from the first column into a single necessary condition; and (b) removing any particular condition that is not necessary for the at least one predicate to evaluate to true.

* * * * *

UNITED STATES PATENT AND TRADEMARK OFFICE
CERTIFICATE OF CORRECTION

Page 1 of 1

PATENT NO. : 10,025,823 B2
APPLICATION NO. : 14/806614
DATED : July 17, 2018
INVENTOR(S) : Das et al.

It is certified that error appears in the above-identified patent and that said Letters Patent is hereby corrected as shown below:

In the Specification

In Column 9, Line 51, delete "pruning" and insert -- pruning. --, therefor.

In Column 15, Line 9, delete "PFL13)." and insert -- PF L13). --, therefor.

Signed and Sealed this
Ninth Day of April, 2019

Andrei Iancu
*Director of the United States Patent and Trademark Office*